US009237545B2

(12) United States Patent
Garin et al.

(10) Patent No.: US 9,237,545 B2
(45) Date of Patent: *Jan. 12, 2016

(54) VARYING PROCESSES TO CONTROL TRANSMISSION CHARACTERISTICS FOR POSITION DETERMINATION OPERATIONS

(71) Applicant: QUALCOMM Incorporated, San Diego, CA (US)

(72) Inventors: Lionel Jacques Garin, Palo Alto, CA (US); Stephane Joseph Beauregard, San Jose, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/094,634

(22) Filed: Dec. 2, 2013

(65) Prior Publication Data

US 2014/0308976 A1 Oct. 16, 2014

Related U.S. Application Data

(60) Provisional application No. 61/812,139, filed on Apr. 15, 2013, provisional application No. 61/891,329, filed on Oct. 15, 2013.

(51) Int. Cl.
*H04W 24/00* (2009.01)
*H04W 64/00* (2009.01)
(Continued)

(52) U.S. Cl.
CPC ............... *H04W 64/00* (2013.01); *G01S 5/00* (2013.01); *G01S 5/0226* (2013.01); *G01S 5/0252* (2013.01); *H04W 4/023* (2013.01)

(58) Field of Classification Search
CPC ..... H04W 64/00; H04W 64/006; H04W 4/00; H04W 4/001; H04W 4/003; H04W 4/005; H04W 4/02; H04W 28/00; H04W 48/00; H04W 4/023; H04W 4/025; H04W 4/04

USPC ............ 455/403, 414.1, 414.2, 456.1, 456.2, 455/456.3, 456.5, 561, 562.1
See application file for complete search history.

(56) References Cited

U.S. PATENT DOCUMENTS 6,061,561 A   5/2000  Alanara et al.
6,088,586 A   7/2000  Haverty
(Continued)

FOREIGN PATENT DOCUMENTS

WO          2013030715 A1     3/2013

OTHER PUBLICATIONS

International Search Report and Written Opinion—PCT/US2014/032106—ISA/EPO—Oct. 7, 2014, 8 pgs.
International Search Report and Written Opinion—PCT/US2014/03212—ISA/EPO—Oct. 22, 2014.
(Continued)

*Primary Examiner* — Jean Gelin
(74) *Attorney, Agent, or Firm* — Hunter Clark PLLC

(57) ABSTRACT

Disclosed are systems, apparatus, devices, methods, media, products, and other implementations, including a method that includes determining, at a first wireless device comprising multiple transmit antennas, at least one signal transmission characteristic according to at least one pre-determined varying transmission characteristic determination process. The at least one transmission characteristic includes, for example, a transmit antenna selected from the multiple transmit antennas, a beam characteristic, a cyclic delay diversity parameter, and/or any combination thereof. The method also includes transmitting from the first wireless device to a second wireless device a signal using the at least one signal transmission characteristic determined according to the at least one pre-determined varying transmission characteristic determination process. The transmitted signal is configured to facilitate position determination of the second wireless device upon deriving at the second wireless device a reconstructed value of the at least one signal transmission characteristic determined at the first wireless device.

65 Claims, 8 Drawing Sheets

(51) Int. Cl.
*H04W 4/02* (2009.01)
*G01S 5/00* (2006.01)
*G01S 5/02* (2010.01)

(56) References Cited

U.S. PATENT DOCUMENTS

| | | | |
|---|---|---|---|
| 2004/0116129 | A1 | 6/2004 | Wilson |
| 2007/0066361 | A1* | 3/2007 | Knudsen et al. ............ 455/562.1 |
| 2007/0086420 | A1* | 4/2007 | Schotten et al. .............. 370/348 |
| 2010/0137005 | A1 | 6/2010 | Zeng et al. |
| 2011/0081930 | A1* | 4/2011 | Shimonabe et al. .......... 455/507 |
| 2012/0095673 | A1 | 4/2012 | Choi et al. |
| 2012/0190380 | A1 | 7/2012 | Dupray et al. |
| 2012/0236955 | A1* | 9/2012 | Zhou ............................. 375/267 |
| 2013/0039342 | A1 | 2/2013 | Kazmi |
| 2014/0308973 | A1 | 10/2014 | Garin et al. |

OTHER PUBLICATIONS

Second Written Opinion from International Application No. PCT/US2014/032106, dated Apr. 20, 2015, 5 pages.
Second Written Opinion from International Application No. PCT/US2014/032120, dated Apr. 22, 2015, 5 pages.
International Preliminary Report on Patentability—PCT/US2014/032106, European Patent Office—Munich, Germany, Jul. 22, 2015, 31 pgs.
Businessweek.Com, "Wifarer Doesn't Just Map the Indoors: It Maps the Objects Within—Businessweek", retrieved from Internet, URL: http://www.bloomberg.com/bw/articles/2012-08-01/wifarer-doesnt-just-map-the-indoors-it-maps-the-objects-within, retrieved on Apr. 9, 2013, 16 pages.
International Preliminary Report on Patentability—PCT/US2014/032120, European Patent Office—Berlin, Germany, Jul. 31, 2015, 32 pgs.

* cited by examiner

VARYING PROCESSES TO CONTROL TRANSMISSION CHARACTERISTICS FOR POSITION DETERMINATION OPERATIONS

CLAIM OF PRIORITY UNDER 35 U.S.C. §119

The present application claims the benefit of and priority to U.S. Provisional Application Ser. No. 61/812,139, entitled "SIGNAL VARIATION FOR POSITION DETERMINATION PROCESSES," filed Apr. 15, 2013, and to U.S. Provisional Application Ser. No. 61/891,329, entitled "VARYING PROCESSES TO CONTROL TRANSMISSION CHARACTERISTICS FOR POSITION DETERMINATION OPERATIONS," filed Oct. 15, 2013, both of which are assigned to the assignee hereof, and expressly incorporated herein by reference.

BACKGROUND

One technique to facilitate location determination is based on use of signal parameters of a signal received at a device whose position/location is to be determined. For example, measurements such as round-trip time (RTT), received signal strength indicator (RSSI), etc., can be used to facilitate position determination through such techniques as, for example, RTT-fingerprinting, RSSI-fingerprinting, etc.

Signal information needed for position determination (including indoor positioning determination using signals transmitted by WiFi base stations) can generally be collected by anyone with access to the venue. This may be problematic for venue owners operating the signal-transmitting base stations, who could lose possible monetization benefits they could have received from providing position-determination services that are being diverted by $3^{rd}$ party (e.g., other mapping/location-determination service providers).

Furthermore, future positioning systems will likely leverage on-phone sensor measurements (accelerometers, rate gyros, magnetometers and barometers) as well as WiFi signals. Beacon messages from APs might be leveraged to obtain position or speed-dependent measurements. For instance, the RSSI and the channel impulse response (CIR) as estimated by a receiver from the beacon messages are dependent on position of the receiver relative to an AP. Variations in the CIR and the RSSI (i.e., fast fading statistics) can be used to estimate a mobile's speed (or at the very least, a stopped state). Currently, it is difficult to prevent/inhibit anyone from leveraging these kinds of receive-only measurements for positioning purposes.

SUMMARY

Disclosed herein are methods, systems, apparatus, devices, products and other implementations, including a method that includes controllably modifying, at a first wireless device, an original unmodified value of at least one PHY-layer signal parameter for a signal according to at least one pre-determined varying signal modification process. The at least one PHY-layer signal parameter includes, for example, amplitude, frequency, timestamp, gain, signal equalization, and/or any combination thereof. The method further includes transmitting, to a second wireless device, the signal with a controllably modified value of the at least one PHY-layer signal parameter, the transmitted signal configured to facilitate position determination of the second wireless device when the original unmodified value of the at least one PHY-layer signal parameter is determined at the second wireless device from the controllably modified value of the at least one PHY-layer signal parameter.

Embodiments of the method may include at least some of the features described in the present disclosure, including one or more of the following features.

Controllably modifying the original unmodified value of the at least one PHY-layer signal parameter according to the at least one pre-determined varying signal modification process may include controllably modifying original unmodified values of two or more PHY-layer signal parameters according to respective different pre-determined varying signal modification processes.

One of the two or more PHY-layer signal parameters may include at least one of, for example, delay and/or phase.

Controllably modifying the original unmodified value of the at least one PHY-layer signal parameter according to the at least one pre-determined varying signal modification process may include controllably modifying the original unmodified value of the at least one PHY-layer signal parameter according to a pseudorandom-time-variation-based process.

Controllably modifying the original unmodified value of the at least one PHY-layer signal parameter according to the at least one pre-determined varying signal modification process may include controllably modifying the original unmodified value of the at least one PHY-layer signal parameter according to an autoregressive moving average process.

Controllably modifying the original unmodified value of the at least one PHY-layer signal parameter according to the autoregressive moving average process may include generating a sequence of random numbers based on a pseudorandom generator process, inputting the sequence of random numbers to a z-transform implementation of the autoregressive moving average process to generate a resultant sequence, and modifying the original unmodified value of the at least one PHY-layer signal parameter based on the resultant sequence. Respective clocks at the first wireless device and the second wireless device may be synchronized relative to a reference time, and a second pseudorandom number sequence at the second wireless device may be generated such that the second pseudorandom number sequence is synchronized with the sequence of random numbers generated at the first wireless device.

The transmitted signal configured to facilitate position determination at the second wireless device may be configured to facilitate position determination at the second wireless device based on one or more of, for example, a received signal strength indicator (RSSI)-based positioning determination process, a round trip time (RTT)-based position determination process, a speed-based position determination process aided by an inertial navigation system, and/or any combination thereof.

The RSSI-based position determination process may include an RSSI-fingerprinting process (e.g., matching an RSSI signature from various received transmitters to previously collected RSSI measurements/signatures), and the RTT-based position determination process may include an RTT-fingerprinting process.

The first wireless device comprises may include an access point. The access point may include a WiFi-based station.

The second wireless device may include a preauthorized wireless device equipped with an undithering unit configured to enable undithering of the signal with the at least one PHY-layer signal parameter value controllably modified at the first wireless device according to the at least one pre-determined varying signal modification process.

In some variations, a wireless device is disclosed that includes one or more processors, and storage media including computer instructions. The computer instructions, when executed on the one or more processors, cause operations that include controllably modifying an original unmodified value of at least one PHY-layer signal parameter for a signal according to at least one pre-determined varying signal modification process. The at least one PHY-layer signal parameter includes, for example, amplitude, frequency, timestamp, gain, signal equalization, and/or any combination thereof. The operations further include transmitting, to an other wireless device, the signal with a controllably modified value of the at least one PHY-layer signal parameter, the transmitted signal configured to facilitate position determination of the other wireless device when the original unmodified value of the at least one PHY-layer signal parameter is determined at the other wireless device from the controllably modified value of the at least one PHY-layer signal parameter.

Embodiments of the wireless device may include at least some of the features described in the present disclosure, including at least some of the features described above in relation to the method.

In some variations, an apparatus is disclosed. The apparatus includes means for controllably modifying an original unmodified value of at least one PHY-layer signal parameter for a signal according to at least one pre-determined varying signal modification process. The at least one PHY-layer signal parameter includes, for example, amplitude, frequency, timestamp, gain, signal equalization, and/or any combination thereof. The apparatus further includes means for transmitting, to a receiving wireless device, the signal with a controllably modified value of the at least one PHY-layer signal parameter, the transmitted signal configured to facilitate position determination of the receiving wireless device when the original unmodified value of the at least one PHY-layer signal parameter is determined at the receiving wireless device from the controllably modified value of the at least one PHY-layer signal parameter.

Embodiments of the apparatus may include at least some of the features described in the present disclosure, including at least some of the features described above in relation to the method and the device, as well as one or more of the following features.

The means for controllably modifying the original unmodified value of the at least one PHY-layer signal parameter according to the at least one pre-determined varying signal modification process may include means for controllably modifying original unmodified values of two or more PHY-layer signal parameters according to respective different pre-determined varying signal modification processes.

The means for controllably modifying the original unmodified value of the at least one PHY-layer signal parameter according to the at least one pre-determined varying signal modification process may include means for controllably modifying the original unmodified value of the at least one PHY-layer signal parameter according to a pseudorandom-time-variation-based process.

The means for controllably modifying the original unmodified value of the at least one PHY-layer signal parameter according to the at least one pre-determined varying signal modification process may include means for controllably modifying the original unmodified value of the at least one PHY-layer signal parameter according to an autoregressive moving average process.

The means for controllably modifying the original unmodified value of the at least one PHY-layer signal parameter according to the autoregressive moving average process may include means for generating a sequence of random numbers based on a pseudorandom generator process, means for inputting the sequence of random numbers to a z-transform implementation of the autoregressive moving average process to generate a resultant sequence, and means for modifying the original unmodified value of the at least one PHY-layer signal parameter based on the resultant sequence.

In some variations, a processor readable media is disclosed. The processor readable media is programmed with a set of instructions executable on a processor that, when executed, causes operations that include controllably modifying, at a first wireless device, an original unmodified value of at least one PHY-layer signal parameter for a signal according to at least one pre-determined varying signal modification process. The at least one PHY-layer signal parameter includes, for example, amplitude, frequency, timestamp, gain, signal equalization, and/or any combination thereof. The set of instructions causes further operations including transmitting, to a second wireless device, the signal with a controllably modified value of the at least one PHY-layer signal parameter, the transmitted signal configured to facilitate position determination of the second wireless device when the original unmodified value of the at least one PHY-layer signal parameter is determined at the second wireless device from the controllably modified value of the at least one PHY-layer signal parameter.

Embodiments of the processor-readable media may include at least some of the features described in the present disclosure, including at least some of the features described above in relation to the method, the device, and the apparatus.

In some variations, an additional method is disclosed. The additional method includes receiving, at a first wireless device, a signal transmitted from a second wireless device, with controllably modified at least one PHY-layer signal parameter value that was generated according to at least one pre-determined varying signal modification process applied to an original unmodified value of at least one PHY-layer signal parameter. The at least one PHY-layer signal parameter includes, for example, amplitude, frequency, timestamp, gain, signal equalization, or any combination thereof. The additional method also includes determining, from the received signal, original unmodified value of the at least one PHY-layer signal parameter, and determining a position of the first wireless device based, at least in part, on the original unmodified value of the at least one PHY-layer signal parameter of the signal, determined from the controllably modified at least one PHY-layer signal parameter value of the signal received at the first wireless device.

Embodiments of the additional method may include at least some of the features described in the present disclosure, including at least some of the features described above in relation to the first method, the device, the apparatus, and the processor-readable media, as well as one or more of the following features.

The controllably modified at least one PHY-layer signal parameter value of the received signal generated according to the at least one pre-determined varying signal modification process may include controllably modified two or more PHY-layer signal parameter values generated according to respective different pre-determined varying signal modification processes applied to respective original unmodified values of two or more PHY-layer signal parameters of the signal transmitted from the second wireless device.

The controllably modified at least one PHY-layer signal parameter value of the received signal generated according to the at least one pre-determined varying signal modification process may be generated according to a pseudorandomtime-variation-based process applied to the original unmodified value of the at least one PHY-layer signal parameter of the signal transmitted from the second wireless device.

The controllably modified at least one PHY-layer signal parameter value of the received signal generated according to the at least one pre-determined varying signal modification process may be generated according to an autoregressive moving average process applied to the original unmodified value of the controllably modified at least one PHY-layer signal parameter of the signal transmitted from the second wireless device.

The controllably modified at least one PHY-layer signal parameter value generated according to the autoregressive moving average process may be generated by generating, at the second wireless device, a sequence of random numbers based on a pseudorandom generator process, inputting, at the second wireless device, the sequence of random numbers to a z-transform implementation of the autoregressive moving average process to generate a resultant sequence, and modifying, at the second wireless device, the original unmodified value of the at least one PHY-layer signal parameter based on the resultant sequence.

The method may further include synchronizing a first clock at the first wireless device to a second clock at the second wireless device relative to a reference time, and generating a second pseudorandom number sequence at the first wireless device such that the second pseudorandom number sequence is synchronized with the sequence of random numbers generated at the second wireless device.

Determining the position of the first wireless device may include determining the position of the first wireless device based on one or more of, for example, a received signal strength indicator (RSSI)-based positioning determination process, a round trip time (RTT)-based position determination process, a speed-based position determination process aided by an inertial navigation system, and/or any combination thereof.

The RSSI-based position determination process may include an RSSI-fingerprinting process (e.g., matching measured RSSI values to a previously collected baseline of RSSI measurements/fingerprints), and the RTT-based position determination process comprises an RTT-fingerprinting process.

The second wireless device may include an access point (e.g., a WiFi-based access point).

The first wireless device may include a preauthorized wireless device equipped with an undithering unit configured to enable undithering of the signal with the at least one PHY-layer signal parameter value controllably modified at the second wireless device according to the at least one pre-determined varying signal modification process.

In some variations, an additional wireless device is disclosed. The additional wireless device includes one or more processors, and storage media. The storage media include computer instructions that, when executed on the one or more processors, cause operations including receiving a signal, transmitted from an other wireless device, with a controllably modified at least one PHY-layer signal parameter value that was generated according to at least one pre-determined varying signal modification process applied to an original unmodified value of at least one PHY-layer signal parameter. The at least one PHY-layer signal parameter includes, for example, amplitude, frequency, timestamp, gain, signal equalization, and/or any combination thereof. The computer instructions cause further operations including determining, from the received signal, the original unmodified value of the at least one PHY-layer signal parameter, and determining a position of the wireless device based, at least in part, on the original unmodified value of the at least one PHY-layer signal parameter of the signal, determined from the controllably modified at least one PHY-layer signal parameter value of the signal received at the wireless device.

Embodiments of the additional wireless device may include at least some of the features described in the present disclosure, including at least some of the features described above in relation to the methods, the first device, the apparatus, and the processor-readable media.

In some variations, an additional apparatus is disclosed. The additional apparatus includes means for receiving a signal, transmitted from a transmitting wireless device, with a controllably modified at least one PHY-layer signal parameter value that was generated according to at least one pre-determined varying signal modification process applied to an original unmodified value of at least one PHY-layer signal parameter. The at least one PHY-layer signal parameter includes, for example, amplitude, frequency, timestamp, gain, signal equalization, and/or any combination thereof. The additional apparatus also includes means for determining, from the received signal, the original unmodified value of the at least one PHY-layer signal parameter, and means for determining a position of the apparatus based, at least in part, on the original unmodified value of the at least one PHY-layer signal parameter of the signal, determined from the controllably modified at least one PHY-layer signal parameter value of the signal received at the apparatus.

Embodiments of the additional apparatus may include at least some of the features described in the present disclosure, including at least some of the features described above in relation to the methods, the devices, the first apparatus, and the processor-readable media, as well as one or more of the following features.

The apparatus may further include means for synchronizing a clock at the apparatus to an other clock at the transmitting wireless device relative to a reference time, and means for generating a second pseudorandom number sequence at the apparatus such that the second pseudorandom number sequence is synchronized with the sequence of random numbers generated at the transmitting wireless device.

The means for determining the position of the apparatus may include means for determining the position of the apparatus based on one or more of, for example, a received signal strength indicator (RSSI)-based positioning determination process, a round trip time (RTT)-based position determination process, a speed-based position determination process aided by an inertial navigation system, and/or any combination thereof.

In some variations, additional processor readable media programmed with a set of instructions executable on a processor is disclosed. The set of instructions, when executed, causes operations comprising receiving at a first wireless device a signal, transmitted from a second wireless device, with a controllably modified at least one PHY-layer signal parameter value that was generated according to at least one pre-determined varying signal modification process applied to an original unmodified value of at least one PHY-layer signal parameter. The at least one PHY-layer signal parameter includes, for example, amplitude, frequency, phase, delay, timestamp, gain, signal equalization, and/or any combination thereof. The set of instructions, when executed, also causes further operations including determining, from the received signal, the original unmodified value of the at least one PHY-layer signal parameter value, and determining a position of the first wireless device based, at least in part, on the original unmodified value of the at least one PHY-layer signal parameter of the signal, determined from the controllably modified at least one PHY-layer signal parameter value of the signal received at the first wireless device.

Embodiments of the additional processor readable media may include at least some of the features described in the present disclosure, including at least some of the features described above in relation to the methods, the devices, the apparatus, and the first processor-readable media.

In some variations, a further method is disclosed. The further method includes determining, at a first wireless device comprising multiple transmit antennas, at least one signal transmission characteristic according to at least one pre-determined varying transmission characteristic determination process. The at least one transmission characteristic includes, for example, a transmit antenna selected from the multiple transmit antennas, a beam characteristic, a cyclic delay diversity parameter, and/or any combination thereof. The further method also includes transmitting from the first wireless device to a second wireless device a signal using the at least one signal transmission characteristic determined according to the at least one pre-determined varying transmission characteristic determination process. The transmitted signal is configured to facilitate position determination of the second wireless device upon deriving at the second wireless device a reconstructed value of the at least one signal transmission characteristic determined at the first wireless device.

Embodiments of the further method may include at least some of the features described in the present disclosure, including at least some of the features described above in relation to the methods, the devices, the apparatus, and the processor-readable media, as well as one or more of the following features.

The further method may further include controllably modifying an original unmodified value of at least a second signal transmission characteristics according to at least one pre-determined varying transmission characteristic modification process, the second signal transmission characteristic including, for example, signal amplitude, signal frequency, signal timestamp, signal gain, signal equalization, signal delay, signal phase, and/or any combination thereof.

Determining the at least one signal transmission characteristic according to the at least one pre-determined varying transmission characteristic determination process may include determining the at least one signal transmission characteristic according to at least one pseudorandom-time-variation-based process.

Determining the at least one signal transmission characteristic according to the at least one pre-determined varying transmission characteristic determination process may include selecting the transmit antenna from the multiple transmit antennas according to a pseudorandom-time-variation-based antenna selection process.

Determining the at least one signal transmission characteristic according to the at least one pre-determined varying transmission characteristic determination process may include controllably adjusting, according to one or more pseudorandom-time-variation-based beam control processes, a corresponding relative phase and a corresponding amplitude for each of multiple signals respectively directed to each of the multiple transmit antennas to control a varying beam.

Determining the at least one signal transmission characteristic according to the at least one pre-determined varying transmission characteristic determination process may include controllably adjusting, according to at least one pseudorandom-time-variation-based cyclic delay process, a corresponding delay added to at least one of multiple signals respectively directed to at least one of the multiple transmit antennas.

Determining the at least one signal transmission characteristic according to the at least one pre-determined varying transmission characteristic determination process may include determining the at least one signal transmission characteristic according to at least one autoregressive moving average process.

Determining the at least one signal transmission characteristic according to the at least one autoregressive moving average process may include generating a sequence of random numbers based on a pseudorandom generator process, inputting the sequence of random numbers to a z-transform implementation of the at least one autoregressive moving average process to generate a resultant sequence, and determining the at least one signal transmission characteristic based on the resultant sequence.

Respective clocks at the first and second wireless devices may be synchronized relative to a reference time, and a second pseudorandom number sequence at the second wireless device may be generated such that the second pseudorandom number sequence is synchronized with the sequence of random numbers generated at the first wireless device.

The transmitted signal configured to facilitate position determination of the second wireless device may be configured to facilitate position determination of the second wireless device based on one or more of, for example, a received signal strength indicator (RSSI)-based positioning determination process, a round trip time (RTT)-based position determination process, a speed-based position determination process aided by an inertial navigation system, and/or any combination thereof.

The first wireless device may include an access point.

The second wireless device may include a preauthorized wireless device equipped with an undithering unit configured to enable undithering of the signal transmitted from the first wireless device using the at least one signal transmission characteristic determined according to the at least one pre-determined varying transmission characteristic determination process.

In some variations, a further wireless device is disclosed. The further wireless device includes multiple transmit antennas, one or more processors, and storage media comprising computer instructions. The computer instructions, when executed on the one or more processors, cause operations that include determining, at the wireless device, at least one signal transmission characteristic according to at least one pre-determined varying transmission characteristic determination process. The at least one transmission characteristic includes, for example, a transmit antenna selected from the multiple transmit antennas, a beam characteristic, a cyclic delay diversity parameter, and/or any combination thereof. The computer instructions also cause operations including transmitting from the wireless device to an other wireless device a signal using the at least one signal transmission characteristic determined according to the at least one pre-determined varying transmission characteristic determination process. The transmitted signal is configured to facilitate position determination of the other wireless device upon deriving at the other wireless device a reconstructed value of the at least one signal transmission characteristic determined at the wireless device.

Embodiments of the further wireless device may include at least some of the features described in the present disclosure, including at least some of the features described above in relation to the methods, the devices, the apparatus, and the processor-readable media.

In some variations, a further apparatus is disclosed. The further apparatus includes means for determining at least one signal transmission characteristic according to at least one pre-determined varying transmission characteristic determination process. The at least one transmission characteristic includes one or more of, for example, a transmit antenna selected from multiple transmit antennas, a beam characteristic, a cyclic delay diversity parameter, and/or any combination thereof. The further apparatus also includes means for transmitting to a receiving wireless device a signal using the at least one signal transmission characteristic determined according to the at least one pre-determined varying transmission characteristic determination process. The transmitted signal is configured to facilitate position determination of the receiving wireless device upon deriving at the receiving wireless device a reconstructed value of the at least one signal transmission characteristic determined at the apparatus.

Embodiments of the further apparatus may include at least some of the features described in the present disclosure, including at least some of the features described above in relation to the methods, the devices, the apparatus, and the processor-readable media, as well as one or more of the following features.

The further apparatus may additionally include means for controllably modifying an original unmodified value of at least a second signal transmission characteristics according to at least one pre-determined varying transmission characteristic modification process, the second signal transmission characteristic including, for example, signal amplitude, signal frequency, signal timestamp, signal gain, signal equalization, signal delay, signal phase, and/or any combination thereof.

The means for determining the at least one signal transmission characteristic according to the at least one pre-determined varying transmission characteristic determination process may include means for selecting the transmit antenna from the multiple transmit antennas according to a pseudo-random-time-variation-based antenna selection process.

The means for determining the at least one signal transmission characteristic according to the at least one pre-determined varying transmission characteristic determination process may include means for controllably adjusting, according to one or more pseudorandom-time-variation-based beam control processes, a corresponding relative phase and a corresponding amplitude for each of multiple signals respectively directed to each of the multiple transmit antennas to control a varying beam.

The means for determining the at least one signal transmission characteristic according to the at least one pre-determined varying transmission characteristic determination process may include means for controllably adjusting, according to at least one pseudorandom-time-variation-based cyclic delay process, a corresponding delay added to at least one of multiple signals respectively directed to at least one of the multiple transmit antennas.

The means for determining the at least one signal transmission characteristic according to the at least one pre-determined varying transmission characteristic determination process may include means for determining the at least one signal transmission characteristic according to at least one autoregressive moving average process.

The means for determining the at least one signal transmission characteristic according to the at least one autoregressive moving average process may include means for generating a sequence of random numbers based on a pseudorandom generator process, means for inputting the sequence of random numbers to a z-transform implementation of the at least one autoregressive moving average process to generate a resultant sequence, and means for determining the at least one signal transmission characteristic based on the resultant sequence.

In some variations, further processor readable media is provided. The further processor readable media is programmed with a set of instructions executable on a processor that, when executed, causes operations including determining, at a first wireless device comprising multiple antennas, at least one signal transmission characteristic according to at least one pre-determined varying transmission characteristic determination process. The at least one transmission characteristic includes, for example, a transmit antenna selected from the multiple transmit antennas, a beam characteristic, a cyclic delay diversity parameter, and/or any combination thereof. The set of instructions, when executed, also causes the operations of transmitting from the first wireless device to a second wireless device a signal using the at least one signal transmission characteristic determined according to the at least one pre-determined varying transmission characteristic determination process. The transmitted signal is configured to facilitate position determination of the second wireless device upon deriving at the second wireless device a reconstructed value of the at least one signal transmission characteristic determined at the first wireless device.

Embodiments of the further processor readable media may include at least some of the features described in the present disclosure, including at least some of the features described above in relation to the methods, the devices, the apparatus, and the processor-readable media.

In some variations, an additional method is provided that includes receiving, at a first wireless device, a signal transmitted from a second wireless device with multiple transmit antennas using at least one signal transmission characteristic initially determined at the other wireless device according to at least one pre-determined varying transmission characteristic determination process. The at least one signal transmission characteristic includes, for example, a transmit antenna selected from the multiple transmit antennas, a beam characteristic, a cyclic delay diversity parameter, and/or any combination thereof. The additional method also includes deriving, at the first wireless device, a reconstructed value of the at least one signal transmission characteristic initially determined at the second wireless device, and determining a position of the first wireless device based, at least in part, on the derived reconstructed value of the at least one signal transmission characteristic initially determined at the second wireless device according to the at least one pre-determined varying transmission characteristic determination process.

Embodiments of the additional method may include at least some of the features described in the present disclosure, including at least some of the features described above in relation to the methods, the devices, the apparatus, and the processor-readable media, as well as one or more of the following features.

The additional method may further include determining, from the received signal, an original unmodified value of at least a second signal transmission characteristic controllably modified at the second wireless device according to at least one pre-determined varying transmission characteristic modification process, the at least second signal transmission characteristic including, for example, signal amplitude, signal frequency, signal timestamp, signal gain, signal equalization, signal delay, signal phase, and/or any combination thereof.

The at least one signal transmission characteristic, initially determined according to the at least one pre-determined varying transmission characteristic determination process, may be initially determined at the second wireless device according to at least one pseudorandom-time-variation-based process.

The at least one signal transmission characteristic, initially determined according to the at least one pre-determined varying transmission characteristic determination process, may be initially determined at the second wireless device according to at least one autoregressive moving average process.

The at least one signal transmission characteristic initially determined according to the at least one pre-determined varying transmission characteristic determination process may include the transmit antenna selected at the second wireless device from the multiple transmit antennas according to a pseudorandom-time-variation-based antenna selection process.

The at least one signal transmission characteristic determined according to the at least one pre-determined varying transmission characteristic determination process may include a corresponding relative phase and a corresponding amplitude for each of multiple signals, respectively directed to each of the multiple transmit antennas to control a varying beam, the corresponding relative phase and the corresponding amplitude for the each of the multiple signals being controllably adjusted at the second wireless device according to one or more pseudorandom-time-variation-based beam forming processes.

The at least one signal transmission characteristic initially determined according to the at least one pre-determined varying transmission characteristic determination process may include a corresponding delay added to at least one of multiple signals, respectively directed to at least one of the multiple transmit antennas, controllably adjusted at the second wireless device according to a respective at least one pseudorandom-time-variation-based cyclic delay process.

The first wireless device may include a preauthorized wireless device equipped with an undithering unit configured to enable undithering of the signal transmitted from the second wireless device using the at least one signal transmission characteristic determined according to the at least one pre-determined varying transmission characteristic determination process.

In some variations, an additional wireless device is disclosed. The additional wireless device includes one or more processors, and storage media comprising computer instructions. The computer instructions, when executed on the one or more processors, cause operations including receiving at the wireless device a signal transmitted from an other wireless device with multiple transmit antennas using at least one signal transmission characteristic initially determined at the other wireless device according to at least one pre-determined varying transmission characteristic determination process, with the at least one signal transmission characteristic including, for example, a transmit antenna selected from the multiple transmit antennas, a beam characteristic, a cyclic delay diversity parameter, and/or any combination thereof. The computer instructions, when executed, also cause operations including deriving, at the wireless device, a reconstructed value of the at least one signal transmission characteristic initially determined at the other wireless device, and determining a position of the wireless device based, at least in part, on the derived reconstructed value of the at least one signal transmission characteristic initially determined at the other wireless device according to the at least one pre-determined varying transmission characteristic determination process.

Embodiments of the additional wireless device may include at least some of the features described in the present disclosure, including at least some of the features described above in relation to the methods, the devices, the apparatus, and the processor-readable media.

In some variations, an additional apparatus is disclosed. The additional apparatus includes means for receiving a signal transmitted from a transmitting wireless device with multiple transmit antennas using at least one signal transmission characteristic initially determined at the transmitting wireless device according to at least one pre-determined varying transmission characteristic determination process. The at least one signal transmission characteristic includes, for example, a transmit antenna selected from the multiple transmit antennas, a beam characteristic, a cyclic delay diversity parameter, and/or any combination thereof. The additional apparatus also includes means for deriving a reconstructed value of the at least one signal transmission characteristic initially determined at the transmitting wireless device, and means for determining a position of the apparatus based, at least in part, on the derived reconstructed value of the at least one signal transmission characteristic initially determined at the transmitting wireless device according to the at least one pre-determined varying transmission characteristic determination process.

Embodiments of the additional apparatus may include at least some of the features described in the present disclosure, including at least some of the features described above in relation to the methods, the devices, the apparatus, and the processor-readable media, as well as the following feature.

The additional apparatus may further include means for determining, from the received signal, an original unmodified value of at least a second signal transmission characteristics controllably modified at the transmitting wireless device according to at least one pre-determined varying transmission characteristic modification process, with the at least second signal transmission characteristic including, for example, signal amplitude, signal frequency, signal timestamp, signal gain, signal equalization, signal delay, signal phase, and/or any combination thereof.

In some variations, an additional processor readable media is provided. The additional processor readable media is programmed with a set of instructions executable on a processor that, when executed, causes operations including receiving at a first wireless device a signal transmitted from a second wireless device with multiple transmit antennas using at least one signal transmission characteristic initially determined at the second wireless device according to at least one pre-determined varying transmission characteristic determination process. The at least one signal transmission characteristic includes, for example, a transmit antenna selected from the multiple transmit antennas, a beam characteristic, a cyclic delay diversity parameter, and/or any combination thereof. The set of instructions also causes operations including deriving, at the first wireless device, a reconstructed value of the at least one signal transmission characteristic initially determined at the second wireless device, and determining a position of the first wireless device based, at least in part, on the derived reconstructed value of the at least one signal transmission characteristic initially determined at the second wireless device according to the at least one pre-determined varying transmission characteristic determination process.

Embodiments of the additional processor readable media may include at least some of the features described in the present disclosure, including at least some of the features described above in relation to the methods, the devices, the apparatus, and the processor-readable media.

Unless defined otherwise, all technical and scientific terms used herein have the same meaning as commonly or conventionally understood. As used herein, the articles "a" and "an"

refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

BRIEF DESCRIPTION OF THE DRAWING

Like reference symbols in the various drawings indicate like elements.

DESCRIPTION

Figure 1:
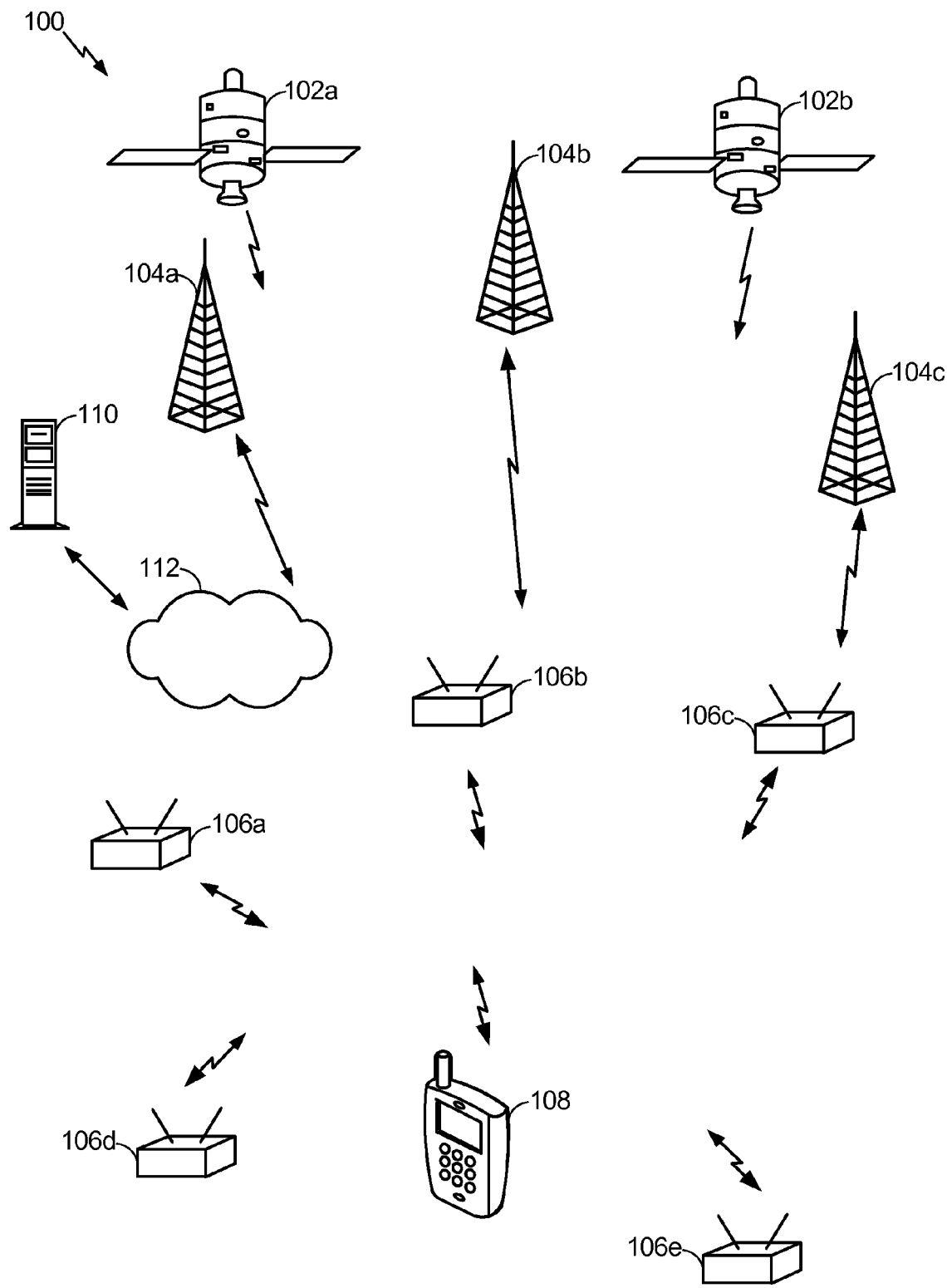
FIG. 1 is a schematic diagram of an example operating environment in which a mobile device may operate.

Disclosed herein are systems, apparatus, devices, products, media, methods, and other implementations to, among other things, limit, or even prevent/inhibit, position determination processes (and also inhibit/prevent fingerprinting collection processes in order to inhibit position determination based on previously collected RSSI or RTT fingerprints) performed by third parties. In some embodiments, the implementations described herein limit/inhibit position determination functionality by unauthorized parties without affecting/impacting WiFi connectivity service, and without limiting or interfering with position determination functionality by authorized parties, nor harming the positioning service for authorized users, applications, and/or devices. Additionally, in some embodiments, the implementations described herein do not change the content included in or represented by the unprocessed or processed signals, nor do they interfere with the communication of the content represented by the signals being modified.

The implementations described herein generally provide more flexibility over implementations that include position determination applications that can be controlled on the mobile devices on which they are installed. For example, a service that is implemented in a High-level Operating System (HLOS), such as, for example, iOS, Android, Windows Phone, etc., may provide a position of different qualities for two location-based services (LBS) applications that use the same service, but with one LBS including authorization of the venue owner, and the other one without. Because signal measurables are varied (or dithered) at a low network layer level (e.g., the PHY layer), unauthorized users, unauthorized positioning applications, and/or unauthorized devices will receive dithered signals (and thus dithered measurements) and will thus only be able to produce low-quality position estimates. On the other hand, authorized users, authorized applications, and/or authorized devices will be able to remove the dithering and generate high-quality position estimates. For example, in some implementations, authorized devices may be equipped with specific integrated circuits/modules configured to dither signals to be transmitted and/or undither received signals in the manner described herein. In such implementations, AP's with dithering/undithering units (realized as, for example, an integrated circuit, firmware, a hardware or software-based driver, etc.) work transparently with dithering/undithering WiFi hardware. Thus, WiFi dithering/undithering units (in authorized devices) would be configured "out of the box" to handle/process proprietary dithering. For instance, the dithering/undithering-equipped AP's could transmit the undithering parameters in an encrypted, vendor-specific data field in beacon packets. Alternatively and/or additionally, dithering/undithering units may be configured to undither received communications (and/or dither outgoing communications) according to pre-determined dithering/undithering functions. In contrast, mobile devices without the proper dithering/undithering WiFi units would not be able to undither dithered communications from other devices. Those unauthorized devices would therefore have to rely on authorized applications (or licensed HLOS drivers, etc.) configured to reverse the PHY dithering employed by transmitting devices.

As will be described in greater details below, in some embodiments, RSSI fingerprinting position determination procedures and/or time-based fingerprinting position determination procedures may be prevented/inhibited. Fingerprinting processes are based on the concept of matching RSSI and/or RTT measurements to previously obtained fingerprinting measurements that are associated with particular positions. For example, RSSI fingerprinting measurements taken at a particular location (corresponding to signal parameters received from one or more base stations) will match previously obtained measurements, with generally only noise and slight changes in RF propagation conditions accounting for the difference of readings. The situation is similar for RTT-fingerprinting-based processes, but with the round-trip time being the measurement that is assumed substantially invariant between the initial fingerprinting profile collection measurements (i.e., to establish a baseline of measurements acquired from different positions) and subsequent RTT measurement operations. In some embodiments, fingerprinting operations to establish a baseline of fingerprints occur prior to, and often independently of, position determination. Generally, the RSSI- and/or RTT-fingerprints are collected in a deliberate survey campaign. Alternatively and/or additionally, the fingerprint database can be built up over time via crowdsourcing. Typically, the compact/summarized version of the fingerprint database (e.g. RSSI/RTT heat maps) is sent to the mobile for real-time use in a positioning engine. In some embodiments, fingerprinting measurements (to establish a baseline of measurements) are initially obtained and are associated with known locations of the measuring device. Subsequently, at later time points, RTT and/or RSSI measurements may be taken (by the same or different measuring device) that are compared to the baseline measurements to enable determining the measuring device's actual or approximate position. In some embodiments, multilateration-based position determination procedures based, for example, on RTT data, RSSI plus a path loss model, etc., may also be prevented/inhibited by employing one or more of the signal modification procedures described herein.

In some embodiments, to inhibit position determination functionality (and/or operations to collect a baseline of fingerprints) by, for example, unauthorized parties, transmission characteristics, such as signal parameters (e.g., PHY-layer signal parameters such as amplitude, frequency, etc.) are modified at an access point in some pre-determined varying manner, e.g., the value or amount that is used to modify the signal may be varied as a function of time, position, etc. For example, at least one PHY-layer signal parameter (which may also be referred to herein as a transmission characteristic) may be varied according to a pseudorandom time varying signal modification process that is known to the transmitting and to the receiving devices. In some embodiments, more than one signal parameter may be controllably modified, with each parameter being modified according to a different pre-determined varying signal modification process. At least one of the two or more PHY-layer parameters may include, in some embodiments, phase and/or delay. The signals with the at least one modified parameter value can be reconstructed, and/or synchronized, by the receiving device to thus determine the original/initial value (i.e., prior to being modified at the transmitting end in accordance with some varying signal modification process(es)) of the at least one signal parameter of the signal transmitted by the transmitting wireless device (such as an access point).

In some embodiments, each transmitting wireless device (e.g., AP) may use its own unique varying signal modification process, such as its own unique pseudorandom time varying signal modification process. Generally, a common and synchronized time variation across all transmitting devices (e.g., transmitting AP's) may not be effective to inhibit position determination by unauthorized parties because the common varying signal modification process would then become a common mode error, and could thus be eliminated.

In some embodiments, perturbation to the signal parameters may be of a constant offset value, or a continuously varying value, that may give the appearance of "natural" noise on the measurements (e.g., due to environmental conditions, such as temperature), or may include a continuously varying value added to a constant offset (e.g., a DC value). In some embodiments, the pre-determined varying signal modification processes (also referred to as dithering) applied to the various signal parameters of the transmitted signals may include processes such as, for example, an autoregressive moving average (ARMA) process. A random seed can be communicated to the positioning device(s), possibly in an encrypted manner, to be used as a dithering correction key (e.g., authorized devices, such as mobile devices equipped with dithering/undithering units, such as a dithering/undithering chip, firmware and/or driver, may be configured to decrypt such encrypted communications sent from AP's equipped with dithering/undithering units to thus obtain the seed). The amplitude, timing, other signal parameters, and varying signal modification processes used may be coordinated from a controller of a managed WiFi network.

In some embodiments, the variations to the values of the signal parameters being modified should be sufficiently large to overwhelm native errors of the positioning engines, but small enough so as not to impact connectivity of the receiving wireless devices to the transmitting wireless devices. In some embodiments, 10 dB of total excursion may be used. For instance, in the case of AP transmit power (Tx), the pseudo-random variation can be up to 10 dB without perturbing normal connectivity.

Thus, disclosed herein are methods, devices, systems, apparatus, products, and other implementations, including a method that includes controllably modifying at a first wireless device (e.g., a terrestrial access point) an original (initial) unmodified value of at least one PHY-layer signal parameter for a signal according to at least one pre-determined varying signal modification process, and transmitting to a second wireless device (e.g., a mobile phone) the signal with the controllably modified value of the at least one PHY-layer signal parameter. The at least one PHY-layer signal parameter includes, for example, amplitude, frequency, timestamp, gain, signal equalization, and/or any combination thereof. The transmitted signal is configured to facilitate position determination of the second wireless device (e.g., based on fingerprinting procedures, signal timing procedures, signal strength procedures, etc.) when the original unmodified value of the at least one PHY-layer signal parameter is determined at the second wireless device from the controllably modified value of the at least one PHY-layer signal parameter. In some embodiments, the at least one PHY-layer signal parameter may include one or more of, for example, amplitude, signal equalization (e.g., for OFDM modulated signals), frequency, phase, and/or delay (or any combination thereof).

In some embodiments, another type of dithering process may be used with such systems as, for example, multiple input and multiple output (MIMO) systems (e.g., multiple antennas at transmit and/or receive ends). Particularly, in some embodiments, successive beacons packets can be transmitted on different antennas selected based on, for example, a pseudorandom selection process that may be known only to the transmitting device and to authorized users, applications, and/or devices. Performing such variable antenna selection procedure may be combined with dithering processes performed with respect to PHY-layer signal parameters (as described herein). Use of variable antenna selection process may render positioning and fingerprinting procedures with dithered signals more difficult for unauthorized users, applications, and/or devices to overcome.

In some implementations, a Cyclic Delay Diversity parameter could be dithered in a pseudo-random fashion over time. For unauthorized applications and users, the net effect would be a time-varying channel frequency response (CFR), even when the receiver and transmitter are not moving relative to each other (e.g., the mobile device is stationary). Such a modification process may be combined, in some embodiments, with PHY-layer signal parameter dithering to make it more difficult for unauthorized users, applications, and/or to use CFR-based processes, such as CFR fingerprinting and CFR-based range and range rate (e.g., speed) estimation. Additionally, for unicast messages, antenna beam attributes (e.g., to control beam steering and/or forming) could also be dithered. For instance, the angle (azimuth and elevation) of the antenna beam pattern maximum as well as the overall beam pattern could be dithered by modifying the relative phase and amplitude of the signals directed to each antenna. This would help to inhibit/prevent unauthorized positioning and fingerprinting operations that leverage angle of arrival (AOA) measurements and CFR measurements. Here too, beam attribute dithering could be combined with the other PHY-layer signal parameter dithering procedures, as described herein.

Thus, in some embodiments, a method is provided which includes determining, at a first wireless device comprising multiple transmit antennas, at least one signal transmission characteristic according to at least one pre-determined varying transmission characteristic determination process. The at least one transmission characteristic includes, for example, a transmit antenna selected from the multiple transmit antennas, a beam characteristic, a cyclic delay diversity parameter, and/or any combination thereof. The method further includes transmitting from the first wireless device to a second wireless device a signal using the at least one signal transmission characteristic determined according to the at least one pre-determined varying transmission characteristic determination process. By deriving at the second wireless device a reconstructed value of the transmission characteristic determined at the first wireless device, the receiving wireless device can obtain location determination information that would otherwise be skewed if the receiving device did not have knowledge of the varying process applied to the at least one transmission characteristic at the transmitting device.

With reference to FIG. 1, shown is a schematic diagram of an example operating environment 100 in which a mobile device 108 operates, e.g., a mobile device configured to perform location determination facilitated, in part, by signals received from one or more transmitting wireless devices (e.g., terrestrial access points), where the received signals include at least one signal parameter (e.g., physical-layer, or PHY-layer, parameters, such as amplitude, frequency, etc.) that has been controllably modified using at least one pre-determined varying signal modification process. The mobile device (also referred to as a wireless device or as a mobile station) 108 may be configured, in some embodiments, to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, etc., and as such the mobile device 108 may include one or more interfaces to communicate with the various types of communications systems. As used herein, communication systems/devices/nodes with which the mobile device 108 may communicate are also referred to as access points (AP's).

As noted, the environment 100 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include Local Area Network Wireless Access Points (LAN-WAPs) 106a-e that may be used for wireless voice and/or data communication with the mobile device 108. The LAN-WAPs 106a-e may also be utilized, in some embodiments, as independents sources of position data, e.g., through fingerprinting-based procedures, through implementation of multilateration-based procedures based, for example, on timing-based techniques (e.g., RTT-based techniques, etc. The LAN-WAPs 106a-e can be part of a Wireless Local Area Network (WLAN), which may operate in buildings and perform communications over smaller geographic regions than a WWAN. Additionally in some embodiments, the LAN-WAPs 106a-e could also be pico or femto cells. In some embodiments, the LAN-WAPs 106a-e may be part of, for example, WiFi networks (802.11x), cellular piconets and/or femtocells, Bluetooth® wireless technology Networks, etc. The LAN-WAPs 106a-e can also include a Qualcomm indoor positioning system (QUIPS). A QUIPS implementation may, in some embodiments, be configured so that a mobile device can communicate with a server that provides the device with data (such as to provide the assistance data, e.g., floor plans, AP MAC IDs, RSSI maps, etc.) for a particular floor or some other region where the mobile device is located. Although five (5) LAN-WAP access points are depicted in FIG. 1, any number of such LAN-WAP's may be used, and, in some embodiments, the environment 100 may include no LAN-WAPs access points at all, or may include a single LAN-WAP access point.

One or more of the LAN-WAP nodes depicted in FIG. 1 may be configured to controllably modify an original unmodified value of at least one PHY-layer parameters of the signals that it is to transmit in order to prevent or inhibit those transmitted signals from being used for position determination by unauthorized users. Because an unauthorized device would not have information on the process(es) that need to be applied to reverse the signal modification process performed by the transmitting device (in order to determine the original value of the PHY-layer parameter before it was modified by a pre-determined varying signal modification process), the unauthorized receiving device will therefore have incorrect/skewed PHY-layer parameter values, thus making it difficult (or altogether preventing) the derivation of an estimated device position based on signals received from the transmitting device(s). Although PHY-layer parameters are controllably modified by the transmitting device, the modification process does not necessarily modify the data content represented by the signal (e.g., the modification process does not necessarily modify digital/packet information carried/represented by the signals whose PHY-layer parameters were controllably modified). In some embodiments, one or more of the LAN-WAP nodes may also be configured to inhibit location determination functionality (e.g., at a receiving device such as the mobile device 108 or any of the WAP nodes) by applying at least one varying process to, for example, an antenna-based transmission characteristic.

As further shown in FIG. 1, the environment 100 may also include a plurality of one or more types of Wide Area Network Wireless Access Points (WAN-WAPs) 104a-c, which may be used for wireless voice and/or data communication, and may also serve as another source of independent information through which the mobile device 108 may determine its position/location. In some embodiments, one or more of the WAN-WAPs 104a-c may also be configured to controllably modify the value of at least one PHY-layer parameters of the signals that it is to transmit (and/or control the value of, for example, transmission characteristics such as antenna-based transmission characteristics) in order to prevent or inhibit those transmitted signals from being used for position determination by unauthorized users, and to transmit these signals with the controllably modified at least one PHY-layer parameter value (and/or transmit the signal using the controllably adjusted value of the at least one transmission characteristic, e.g., antenna-based transmission characteristic).

The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-104c within the WWAN may operate from fixed positions or may be moveable nodes, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

Communication to and from the mobile device 108 (to exchange data, enable position determination of the device 108, etc.) may be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 108 may also be configured to at least receive information from a Satellite Positioning System (SPS) 102a-b, which may be used as an independent source of position information for the mobile device 108. The mobile device 108 may thus include one or more dedicated SPS receivers specifically designed to receive signals for deriving geo-location information from the SPS satellites. Thus, in some embodiments, the mobile device 108 may communicate with any one or a combination of the SPS satellites 102a-b, the WAN-WAPs 104a-c, and/or the LAN-WAPs 106a-e. In some embodiments, each of the aforementioned systems can provide an independent information estimate of the position for the mobile device 108 using different techniques. In some embodiments, the mobile device may combine the solutions derived from each of the different types of access points to improve the accuracy of the position data. It is also possible to hybridize measurements from different systems to get a position estimate, particularly when there is an insufficient number of measurements from all individual systems to derive a position. For instance, in an urban canyon setting, only one GNSS satellite may be visible and provide decent measurements (i.e. raw pseudorange and Doppler observables). By itself, this single measurement cannot provide a position solution. However, it could be combined with measurements from urban WiFi APs, or WWAN cell ranges. When deriving a position using the access points 104a-b, 106a-e, and/or the satellites 102a-b, at least some of the operations/processing may be performed using a positioning server 110 which may be accessed, in some embodiments, via a network 112.

In embodiments in which the mobile device 108 can receive satellite signals, the mobile device may utilize a receiver (e.g., a GNSS receiver) specifically implemented for use with the SPS to extract position data from a plurality of signals transmitted by SPS satellites 102a-b. Transmitted satellite signals may include, for example, signals marked with a repeating pseudo-random noise (PN) code of a set number of chips and may be located on ground based control stations, user equipment and/or space vehicles. The techniques provided herein may be applied to or otherwise enabled for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device or station (MS) refers to a device such as a cellular or other wireless communication device, personal communication system (PCS) device, personal navigation device (PND), Personal Information Manager (PIM), Personal Digital Assistant (PDA), a tablet device, a laptop, recreational navigational-capable sporting devices (e.g., a jogging/cycling equipped with a GPS and/or WiFi receiver), or some other suitable mobile device which may be capable of receiving wireless communication and/or navigation signals, such as navigation positioning signals. The term "mobile station" (or "mobile device") is also intended to include devices which communicate with a personal navigation device (PND), such as by short-range wireless (e.g., Bluetooth® wireless technology), infrared, wireline connection, or other connection, regardless of whether satellite signal reception, assistance data reception, and/or position-related processing occurs at the device or at the PND. Also, "mobile station" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing occurs at the device, at a server, or at another device associated with the network. Any operable combination of the above are also considered a "mobile station."

Figure 2:
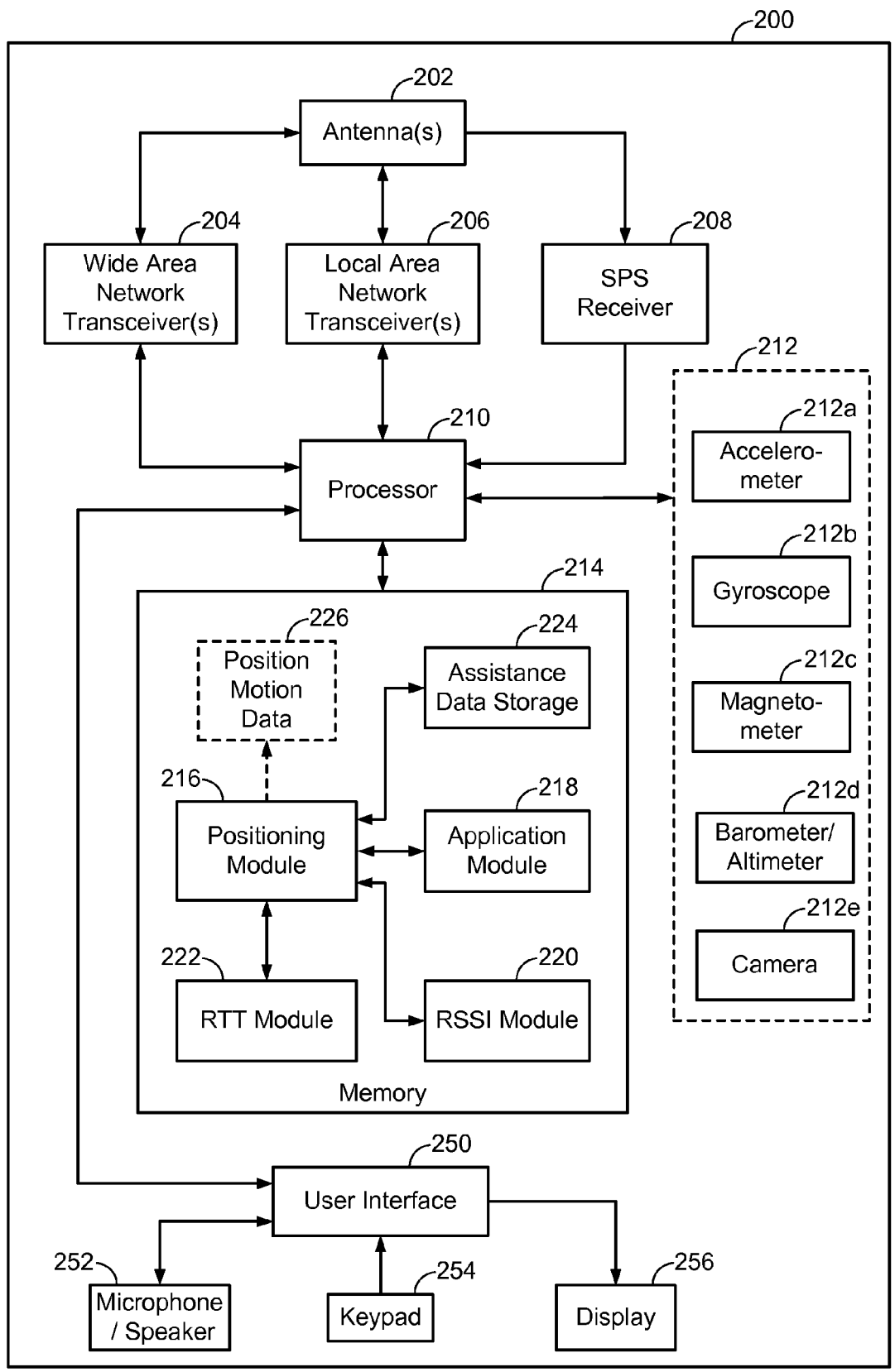
FIG. 2 is a schematic diagram of an example mobile device.

With reference now to FIG. 2, a schematic diagram illustrating various components of an example mobile device 200, which may be similar to the mobile device 108 of FIG. 1, is shown. For the sake of simplicity, the various features/components/functions illustrated in the box diagram of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded.

As shown, the mobile device 200 may include one or more local area network transceivers 206 that may be connected to one or more antennas 202. The one or more local area network transceivers 206 comprise suitable devices, hardware, and/or software for communicating with and/or detecting signals to/from one or more of the LAN-WAPs 106*a-e* depicted in FIG. 1, and/or directly with other wireless devices within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth® wireless technology), etc. Additionally, any other type of wireless networking technologies may be used, for example, Ultra Wide Band, ZigBee, wireless USB, etc. In some embodiments, the unit 206 may be a receiver-only communication unit that can receive signals (e.g., to enable navigational functionality) but cannot transmit signals.

The mobile device 200 may also include, in some implementations, one or more wide area network transceiver(s) 204 that may be connected to the one or more antennas 202. The wide area network (WAN) transceiver 204 may comprise suitable devices, hardware, and/or software for communicating with and/or detecting signals from one or more of, for example, the WAN-WAPs 104*a-c* illustrated in FIG. 1, and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, etc. Additionally, any other type of wireless networking technologies may be used, including, for example, WiMax (802.16), etc. In some embodiments, the unit 204 may be a receiver-only communication unit that can receive signals (e.g., to enable navigational functionality) but cannot transmit signals.

In some embodiments, an SPS receiver (also referred to as a global navigation satellite system (GNSS) receiver) 208 may also be included with the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the mobile device 200 using, in part, measurements obtained by any suitable SPS procedure.

In some embodiments, the mobile device 200 may also include one or more sensors 212 coupled to a processor 210. For example, the sensors 212 may include motion sensors (also referred to as inertial sensors) to provide relative movement and/or orientation information which is independent of motion data derived from signals received by the wide area network transceiver(s) 204, the local area network transceiver(s) 206, and/or the SPS receiver 208. By way of example but not limitation, the motion sensors may include an accelerometer 212*a*, a gyroscope 212*b*, a geomagnetic (magnetometer) sensor 212*c* (e.g., a compass), an altimeter (e.g., a barometric pressure altimeter) 212*d*, and/or other sensor types. In some embodiments, the accelerometer 212*a* may be implemented based on micro-electro-mechanical-system (MEMS). Other types of accelerometers may be used in place of, or in addition to MEMS-based accelerometer. Additionally, a 3D accelerometer, sensitive to the accelerations along three orthogonal axes, may be implemented. In some embodiments, the gyroscope 212*b* may include a gyroscope based on MEMS technology, and may be a single-axis gyroscope, a double-axis gyroscope, or a 3-D gyroscope configured to sense motion about, for example, three orthogonal axes. Other types of gyroscopes may be used in place of, or in addition to MEMS-based gyroscope. In some embodiments, a magnetometer, configured to measure a magnetic field intensity and/or direction (and, thus, may be configured to measure absolute orientation with respect to the local magnetic fields) may also be implemented based on MEMS technology. Such MEMS-based magnetometers may be configured to detect motion caused by the Lorentz force produced by a current through a MEMS conductor. Other types of magnetometers may also be used. An altimeter may, for example, be configured to provide altitude data and thus may facilitate determining a floor in an indoor structure (e.g., a shopping mall) where the device may be located. Based on data representative of altitude measurements performed by the altimeter, navigation tasks, such as obtaining assistance data (including maps) for a particular floor in the indoor structure may be performed. In some embodiments, absolute altitude may be available when a reference barometer, at a known nearby location (e.g., in the same building where the mobile device 200 is located) is available. When such a reference barometer is not available, a barometer can provide change of altitude information, which can be used in conjunction with information from inertial sensors (e.g., the accelerometer, gyroscope, etc.) to, for example, determine a position estimate.

The output of the one or more sensors 212 may be combined in order to provide motion information. For example, estimated position of the mobile device 200 may be determined based on a previously determined position and the distance traveled from that previously determined position as determined from the motion information derived from measurements by at least one of the one or more sensors. In some embodiments, the estimated position of the mobile device may be determined based on probabilistic models (e.g., implemented through a particle filter, leveraging, for example, motion constraints established by venue floor plans, realized using the mobile device 200) using the outputs of the one or more sensors 212. As further shown in FIG. 2, in some embodiments, the one or more sensors 212 may also include a camera 212*e* (e.g., a charge-couple device (CCD)-type camera), which may produce still or moving images (e.g., a video sequence) that may be displayed on a user interface device, such as a display or a screen.

The processor(s) (also referred to as a controller) 210 may be connected to the local area network transceiver(s) 206, the wide area network transceiver(s) 204, the SPS receiver 208, and/or the one or more sensors 212. The processor may include one or more microprocessors, microcontrollers, and/or digital signal processors that provide processing functions, as well as other calculation and control functionality. In some embodiments, a controller may be implemented without use of a processing-based device. The processor 210 may also include storage media (e.g., memory) 214 for storing data and software instructions for executing programmed functionality within the mobile device. The memory 214 may be on-board the processor 210 (e.g., within the same IC package), and/or the memory may be external memory to the processor and functionally coupled over a data bus. Further details regarding an example embodiment of a processor or computation system, which may be similar to the processor 210, are provided below in relation to FIG. 8.

A number of software modules and data tables may reside in memory 214 and be utilized by the processor 210 in order to manage both communications with remote devices/nodes (such as the various access points depicted in FIG. 1), positioning determination functionality, and/or device control functionality. As will be described in greater details below, the processor 210 may be configured, e.g., using software-based implementations, to enable determination, from signals received from one or more transmitting devices, original (i.e., unmodified) value(s) of controllably modified at least one signal parameter value (e.g., PHY-layer parameters). In the implementations described herein, the signals received at the receiving wireless device may have had their original signal parameter values (e.g., amplitude, etc.) modified in a controlled manner through application of a deterministic (and re-producible) pre-determined varying signal-modification process (e.g., a time-dependent dithering function) in order to prevent/inhibit unauthorized devices/applications/users from performing location determination operation using signals provided by the transmitting devices. Thus, the receiving wireless device may perform inverse operations (e.g., by applying inverse functions, provided a priori to the receiving device, to the varying signal-modification functions/processes applied at the transmitting nodes). Once the original values of the signal parameters have been recovered (and thus the distortion/perturbation controllably applied to the signal at the source devices has been reversed), the position of the receiving wireless device may be determined using the recovered signals (e.g., through fingerprint lookup and comparison procedures, multilateration-based procedures, etc.) The processor may also be configured to, in some implementations, derive a reconstructed value for a transmission characteristic, such as an antenna-based characteristic (e.g., an antenna selected from multiple antennas, relative phases and amplitudes of signals directed to the multiple antennas for beam steering operations, cyclic delay, etc.), initially determined at a transmitting device according to at least one varying process (e.g., a pseudorandom process). The transmission characteristic determined at the transmitting device is used in order to, for example, inhibit location determination operations by unauthorized users/applications/devices. In situations where the device 200 has knowledge of the varying process(es) used by the transmitting device, it can derive a reconstructed value to enable it to perform location determination operations (e.g., perform location determination operations more accurately than if the receiving device was not configured to determine the transmission characteristic value initially determined at the transmitting device).

The processor may also be configured to controllably modify values of at least one signal parameter (e.g., PHY-layer parameters, such as amplitude, frequency, etc.) according to a pre-determined varying signal modification process, and to transmit a signal with such modified values to another device (e.g., to an AP, to thus implement bi-directional dithering of signals).

In some embodiments, the mobile device may include multiple antennas in electrical communication to the one or more LAN transceivers 206 and/or the one or more WAN transceivers 204 (in some variations, for each of multiple LAN transceivers and for each of multiple WAN transceivers, there may a corresponding separate antenna). The multiple antennas in communication with the one or more transceivers may be configured to enable implementation of a pre-determined varying process (e.g., a time dependent pseudorandom process) to control/determine at least one antenna-related transmission characteristic used to transmit signals. Implementation of such a pre-determined varying process to control antenna-related transmission characteristics may thus enable dithering of the signal transmitted so that only authorized users/applications/devices (e.g., authorized AP's with which the mobile device 200 is communicating) configured to reverse the antenna-based varying process, realized at the device 200 via the multiple antennas and the one or more transceivers, will be able to obtain correct measurements of the transmitted signal(s) required to perform accurate location determination.

In some embodiments, the transmission characteristic (e.g., antenna-based transmission characteristic) may be the antenna(s) selected during a transmission interval to transmit the signals. For example, the antenna(s) through which a signal to be transmitted is directed may be selected according to pre-determined varying antenna selection process (e.g., a pseudorandom process). A receiving wireless device not configured to undither the transmitted signal that was dithered according to the pre-determined varying antenna selection process may therefore obtain skewed received signal measurements (e.g., because the path followed by the transmitted signal will depend on the antenna selected, the estimated Channel Frequency Response (CFR), RSSI, RTT, etc., which can vary unpredictably). As a result, such a receiving device would not be able to perform accurate location determination processes. In another example, respective relative phase and amplitude of signals directed through the multiple antennas may be controlled (e.g., by the transceivers and/or the processor 210) according to one or more pre-determined varying beam control processes (e.g., pseudorandom-time-variation beam control processes) to control (e.g., form and/or steer) a varying beam directed to the receiving device. By varying the beam according to such a pre-determined process that is known only to authorized users/applications/devices, measurements of signal properties (e.g., RSSI, Angle of Arrival (AoA)) without knowledge of that process will result in values that inhibit accurate determination of the location of the transmitting or receiving wireless device. In a further example, a pre-determined process may be used to delay the various signals directed to the multiple antennas to thus implement a varying (e.g., pseudorandom-time varying) cyclic delay diversity implementation. In this case too, without knowledge of the varying process(s) used to delay the various signals, accurate location determination, based on measurements of signal properties performed at the receiving device, is inhibited.

As further illustrated in FIG. 2, memory 214 may include a positioning module 216, an application module 218, a received signal strength indicator (RSSI) module 220, and/or a round trip time (RTT) module 222. It is to be noted that the functionality of the modules and/or data structures may be combined, separated, and/or be structured in different ways depending upon the implementation of the mobile device 200. For example, the RSSI module 220 and/or the RTT module 222 may each be realized, at least partially, as a hardware-based implementation, and may thus include such devices as a dedicated antenna (e.g., a dedicated RTT and/or RSSI antenna), a dedicated processing unit to process and analyze signals received and/or transmitted via the antenna(s) (e.g., to determine signal strength of a received signals, determine timing information in relation to an RTT cycle), etc.

The application module 218 may be a process running on the processor 210 of the mobile device 200, which requests position information from the positioning module 216. Applications typically run within an upper layer of the software architectures, and may include indoor navigation applications, shopping applications, location-aware service applications, etc. The positioning module 216 may derive the position of the mobile device 200 using information derived from various receivers and modules of the mobile device 200. For example, to determine the mobile device's position based on RTT measurements, reasonable estimates of MAC processing time delays introduced by each transmitting device (e.g., access point) may first be obtained and used to calibrate/adjust the measured RTTs. The measured RTTs may be determined by the RTT module 222, which can measure the timings of signals exchanged between the mobile device 200 and the access points to derive round trip time (RTT) information. In circumstances where a transmitting device includes a delay according to a pre-determined varying signal modification process (e.g., a pseudorandom-time varying signal modification process), the RTT module, or another of the device's modules, may be configured to determine the initial time value of the signal (e.g., without the delay added according to the pre-determined varying signal modification process). For example, an inverse process to the process that added the delay would have to be performed on the received signal. In some embodiments, once measured, the RTT values may be passed to the positioning module 216 to assist in determining the position of the mobile device 200.

Other information that may be determined from communications received by the mobile device 200 (e.g., using one of its transceivers) includes the received signal power, which may be represented in the form of RSSI (determined using the RSSI module 220). The RSSI module 220 may also provide data regarding the signals to the positioning module 216. When using RSSI measurements to determine a mobile device's position, appropriate calibration/adjustment procedures may need to be performed. Additionally, in circumstances where a transmitting device's Tx power is modified, for example, the amplitude of the signal received by the device 200 (which would thus result in skewed RSSI measurements, at the receiving station, that could lead to an incorrect position determination), the device 200 may be configured to determine the original amplitude value (e.g., transceiver Tx power) of the signal (e.g., prior to the pre-determined varying signal modification process performed on an original value of a PHY-layer parameter(s) for a signal to be transmitted from the source transmitting device/node). Once the correct amplitude(s) of the received signal(s) is determined (and a substantially correct RSSI value corresponding to the original, unmodified, PHY-layer parameter of the transmitted signals computed), the position of the device 200 may be determined. Put another way, in such embodiments, the AP Tx power is dithered and the computed RSSI at the device (corresponding to a power that is less than the dithered AP Tx power) will show the same dithering pattern as that applied to the AP's transmitting power. The device 200 will thus be able to undo the dithering seen on the RSSI. A determined position of the mobile device 200 may then be provided to the application module 218.

As further illustrated, the mobile device 200 may also include assistance data storage 224 where assistance data may be stored, including data such as map information, data records relating to location information in an area where the device is currently located, etc. Assistance data may have been downloaded from a remote server. In some embodiments, the mobile device 200 may also be configured to receive supplemental information that includes auxiliary position and/or motion data which may be determined from other sources (e.g., the sensors 212). Such auxiliary position data may be incomplete or noisy, but may be useful as another source of independent information for estimating the processing times of the WAPs. As illustrated in FIG. 2 (using dashed lines), mobile device 200 may optionally store in memory auxiliary position/motion data 226 which may be derived from information received from other sources. Supplemental information may include, but not be limited to, information that can be derived or based upon Bluetooth® wireless technology signals, beacons, RFID tags, and/or information derived from a map (e.g., receiving coordinates from a digital representation of a geographical map by, for example, a user interacting with a digital map).

The mobile device 200 may further include a user interface 250 which provides a suitable interface system, such as a microphone/speaker 252, keypad 254, and a display 256 that allows user interaction with the mobile device 200. The microphone/speaker 252 provides for voice communication services (e.g., using the wide area network transceiver(s) 204 and/or the local area network transceiver(s) 206). The keypad 254 comprises suitable buttons for user input. The display 256 comprises a suitable display, such as, for example, a backlit LCD display, and may further include a touch screen display for additional user input modes.

Figure 3:
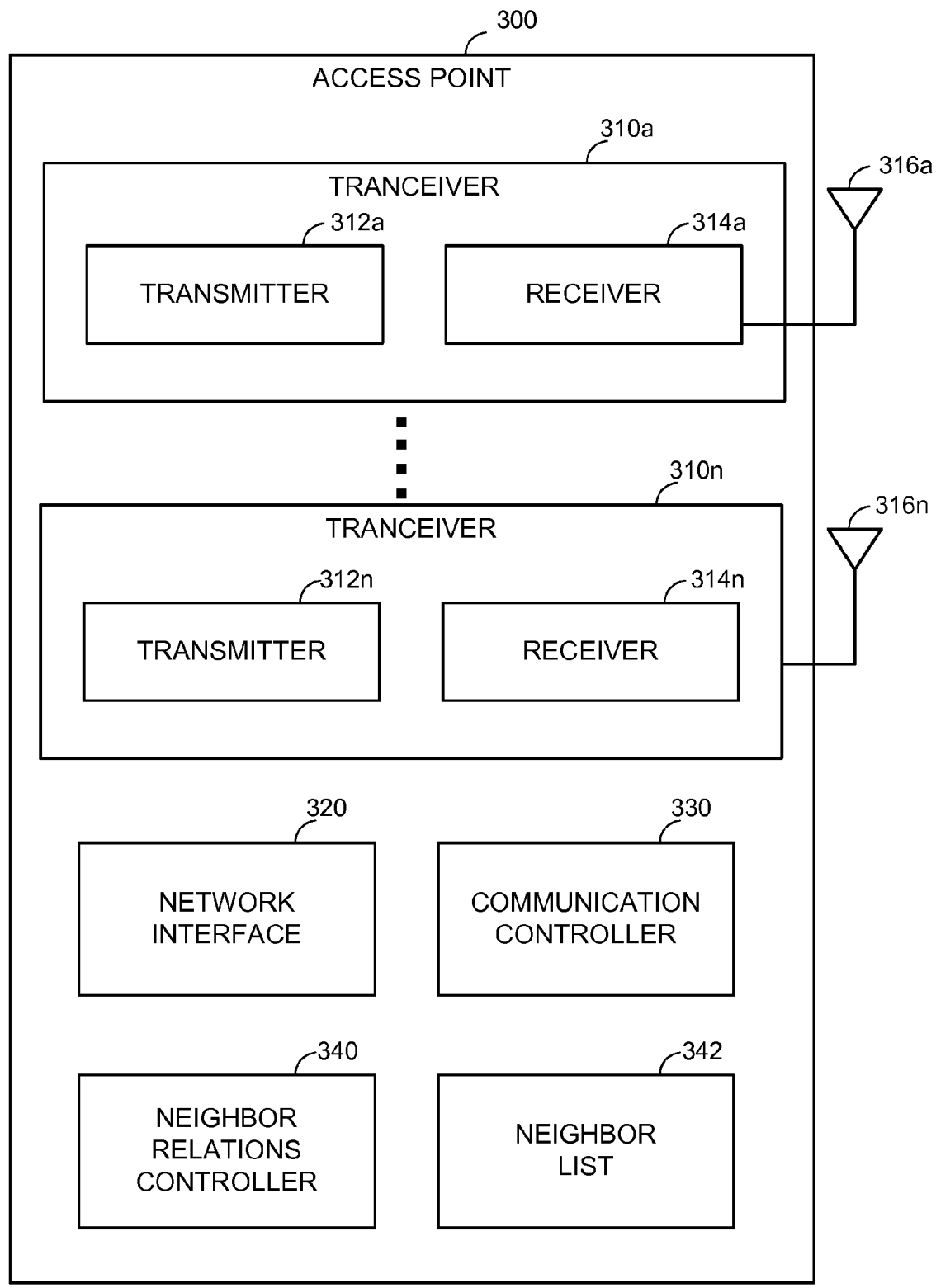
FIG. 3 is a schematic diagram of an example access point.

With reference now to FIG. 3, a schematic diagram of an example transmitting device, such as access point 300, which may be similar to, and be configured to have a functionality similar to that, of any of the various access points depicted in FIG. 1, is shown. The access point 300 may include one or more transceivers 310a-n electrically coupled to one more antennas 316a-n for communicating with wireless nodes, such as, for example, the mobile devices 108 or 200 of FIGS. 1 and 2, respectively. The each of the transceivers 310a-310n may include a respective transmitter 312a-n for sending signals (e.g., downlink messages) and a respective receiver 314a-n for receiving signals (e.g., uplink messages). The access point may also include a network interface 320 to communicate with other network nodes (e.g., sending and receiving queries and responses). For example, each network element may be configured to communicate (e.g., wired or wireless backhaul communication) with a gateway, or other suitable entity of a network, to facilitate communication with one or more core network nodes (e.g., any of the other access points shown in FIG. 1, the positioning server 110, and/or other network devices or nodes). Additionally and/or alternatively, communication with other network nodes may also be performed using the transceivers 310a-n and/or the respective antennas 316a-n.

The access point 300 may also include other components that may be used with embodiments described herein. For example, the access point 300 may include, in some embodiments, a communication controller 330 (which may be similar to the processor 210 of FIG. 2) to manage communications with other nodes (e.g., sending and receiving messages) and to provide other related functionality. For example, the controller 330 may be configured to controllably modify values of at least one signal parameter (e.g., PHY-layer parameters, such as amplitude, frequency, etc.) according to a pre-determined varying signal modification process (such as a pseudorandom-time-variation-based process). By modifying (e.g., distorting/dithering) these parameters, an unauthorized party attempting to use measurements of transmitted signals, but not knowing what process or function was used to modify the signals, would not be able to determine the relationship between signal measurements taken at the receiving device and the positions of the nodes sending the signals received at the device, to thus perform position determination process to determine the device's approximate or exact position. In some embodiments, the controller 330, in conjunction with the one or more transceivers 310a-n and/or the antennas 316a-n, are configured to implement one or more pre-determined varying transmission characteristic processes that are used to transmit signals from the access point 300. As noted, in some embodiments, pre-determined varying antenna-based transmission characteristic determination processes may be implemented, including one or more of, for example, a pseudorandom-time-variation-based antenna selection process to select a transmit antenna from multiple transmit antennas (e.g., one of antennas 316a-n), one or more pseudorandom-time-variation-based beam forming processes to controllably adjust corresponding relative phases and corresponding amplitudes for each of multiple signals respectively directed to each of the multiple transmit antennas to control a varying beam, and/or one or more pseudorandom-time-variation-based cyclic delay processes to controllably adjust a corresponding delay added to at least one of multiple signals respectively directed to at least one of the multiple transmit antennas. It is to be noted that the controlled modification/determination of the transmission characteristics/signal parameters may be done, in some embodiments, without breaching or violating required communication standards (e.g., without substantially deviating from any standardized communication requirements established for such communication protocols as, for example, those related to IEEE 802.11) and/or without modifying the data represented by the signals (e.g., so that the data represented by received signals can still be determined/decoded regardless of any modification to the PHY-layer parameters of the underlying signals, or of the transmission characteristics used).

In some embodiments, the controller 330 may also be configured to determine original signal parameter values of signals, received from other wireless devices (e.g., from a personal mobile device), that were modified according to some predetermined varying signal modification process(es). For example, in some embodiments, an access point, such as the AP 300 of FIG. 3, may be configured to track the position of a personal wireless device. The personal wireless device may have applied a varying signal modification process (dithering process) to prevent/inhibit unauthorized servers or APs from tracking its location. However, an authorized server which was provided with information about the signal modification process employed at the personal wireless device (e.g., was provided with the signal modification process/function applied at the personal wireless device, or was provided with the or inverse process/function corresponding to the process/function applied at the personal wireless device) can be configured to determine the modified/dithered signals' original parameter values, to thus enable the authorized server to track the personal wireless device's position. In some embodiments, the controller 330 may further be configured to reconstruct the signal transmission characteristic value (e.g., antenna-based transmission characteristic value) that was determined and used at a transmitting device (e.g., a mobile device in communication with the access point 300). Thus, for example, in some embodiments, the access point 300 (e.g., through the controller 330, in conjunction with the device's transceivers and antennas) may be configured to receiving a signal transmitted from another wireless device (where that other device includes multiple transmit antennas) using at least one signal transmission characteristic initially determined at the other wireless device according to at least one pre-determined varying transmission characteristic determination process, with the at least one signal transmission characteristic including one or more of, for example, a transmit antenna selected from the multiple transmit antennas, a beam characteristic, and/or a cyclic delay diversity parameter. The access point 300, in such embodiments, may also be configured to derive a reconstructed value of the at least one signal transmission characteristic initially determined at the other wireless device, and determine a position of the wireless device based, at least in part, on the derived reconstructed value of the at least one signal transmission characteristic initially determined at the other wireless device according to the at least one pre-determined varying transmission characteristic determination process. For example, the access point 300 may be configured to determine the particular antenna(s) from the transmitting device's multiple antennas that was used by the transmitting device to transmit the signals to the access point 300. Knowing the particular antenna(s) can thus enable the access point 300 to have more accurate information about the path travelled by the signal it received, and thus to more accurately determined location information in relation to the transmitting device and/or the access point 300.

In addition, the access point 300 may include, in some embodiments, neighbor relations controllers (e.g., neighbor discovery modules) 340 to manage neighbor relations (e.g., maintaining a neighbor list 342) and to provide other related functionality. The communication controller may be implemented, in some embodiments, as a processor-based device, with a configuration and functionality similar to that shown and described in relation to FIG. 8.

Figure 4:
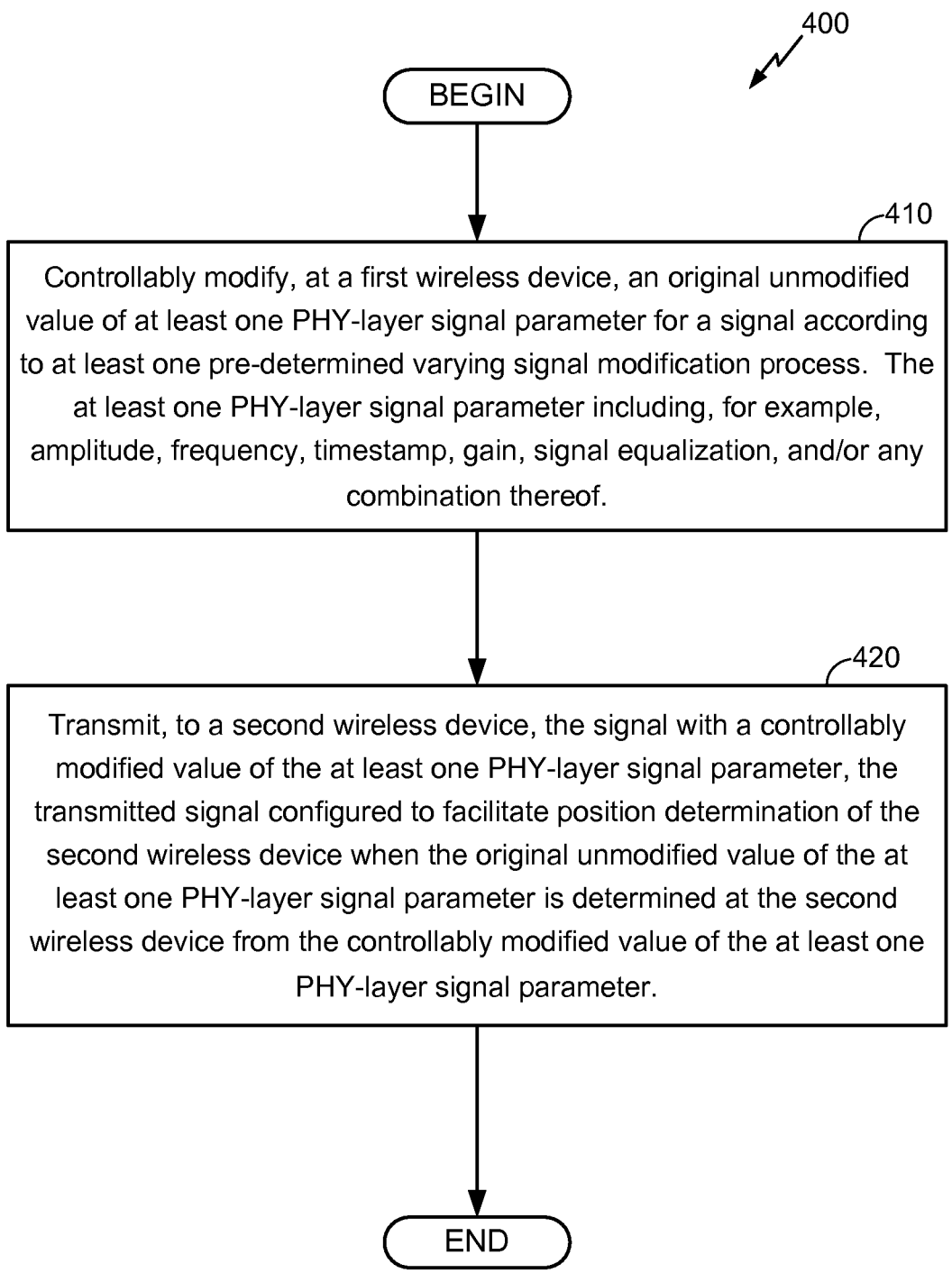
FIG. 4 is a flowchart of an example signal-modification procedure.

With reference to FIG. 4, a flowchart of an example procedure 400 used for location determination operations is shown. The operations depicted in FIG. 4 are generally performed at a device/node (which may be similar to any of the WAP's 104a-c and 106a-e depicted in FIG. 1 or the access point 300 depicted in FIG. 3) transmitting signals that are used by receiving devices to perform, among other operations, position determination. In some embodiments, the procedure 400 may also be performed at a personal wireless device (such as the 108 or 200 of FIGS. 1 and 2, respectively).

An original unmodified value of at least one PHY-layer signal parameter for a signal that is to be transmitted from a first wireless device (the transmitting device) is controllably modified 410 according to a pre-determined varying signal modification process (e.g., obtain or determine the original unmodified value of the PHY-layer signal parameter, and apply the varying signal modification process to that original unmodified value). As noted, in some embodiments, the PHY-layer signal parameters of the signal include, for example, the amplitude (also referred to as the transmit power, or Tx), the signal's timestamp, a center frequency, gain, signal equalization, and/or any combination thereof. As also noted, the pre-determined varying signal modification process is configured to modify the at least one signal parameter (and in some embodiments, two or more parameters that may each be modified according to a different process), generally without affecting content encoded by the signal, in a controlled manner that is known to an authorized user/device, but not known to an unauthorized user/device. Table 1 below provides examples of some of the different signal parameters that may be dithered and what effect such dithering has on the ability to determine position of a receiving device (Table 1 also includes antenna-based characteristics that can be controlled to inhibit location determination by unauthorized users/applications/devices).

TABLE 1

| # | Parameter | Description | Effect/Purpose |
|---|---|---|---|
| 1 | Tx power | Transmission power (amplitude). | Defeat/inhibit RSSI fingerprinting, RSSI-based multilateration procedures, and positioning processes. |
| 2 | Tx equalizer | Change the Tx gain on each OFDM subcarrier. | Defeat/inhibit channel-impulse response (CIR) position fingerprinting based approaches. Defeat/inhibit speed estimation via fast fading statistics or related approaches. Confuse Time of Arrival (TOA) procedures/techniques by blurring TOA edges. Confuse Angle of Arrival (AoA) procedures in Multiple-Input Multiple-Output (MIMO) systems. |
| 3 | Timestamps | Dither a timestamp value inserted into outgoing packets. | Defeat/inhibit RTT or Rx (e.g., AP beacon) OWPT (One-way Propagation Time) estimation. |
| 4 | Tx time | Random advance/delay of actual RF transmission time relative to a timestamp inserted into outgoing packets. | Defeat/inhibit RTT and Rx (e.g., AP beacon) OWPT estimation. |
| 5 | Center frequency | Dither the Tx center frequency. | Defeat/inhibit Doppler-based aiding (for fast moving vehicles) approaches. |
| 6 | Antenna Selection | Using a pseudo-random sequence, select one of many antennas to use for transmission. | Will have at least some of the same effects as those described in rows 1-4 above. |
| 7 | Relative phase and amplitude directed to multiple transmit antennas | Dither antenna beam forming/steering. | Will have at least some of the same effects as those described in rows 1-4 above. |
| 8 | Cyclic delay diversity parameter | Cause a time-varying channel frequency response (CFR). | Will have at least some of the same effects as those described in rows 1-4 above. |

In some embodiments, controllably modifying the original unmodified value of the at least one signal parameter according to at least one pre-determined varying signal modification process may include controllably modifying the original unmodified value of the at least one PHY-layer signal parameter according to a pseudorandom-process.

In some embodiments, controllably modifying the original/initial value of the at least one signal parameter according to at least one pre-determined varying signal modification process may include controllably modifying the original unmodified value of the at least one PHY-layer signal parameter according to an autoregressive moving average process. In some embodiments, an autoregressive moving average (ARMA) filter may be used with a pseudorandom process in the following manner. A pseudo-random generator may generate a sequence of random numbers (typically a sequence of −1s and +1s) that is sent into an ARMA filter that can be implemented digitally. The output is a slowly moving output, that can be added to, for example, the nominal Tx power, the timestamp, the frequency, the nominal MAC processing delay (i.e., the RTT turn-around time at the AP), etc. The architecture used for this process may be:

pseudo-random generator.

ARMA process equivalent z-transform (e.g., a polynomial fraction with different powers of $z^{-1}$ representing different delays).

The parameters of the randomization process may include:
a seed value to be injected in the pseudo random generator,
a start time,
a sample period at which the pseudo-random generator and the ARMA process will be updated, and
a scaling coefficient that will multiply the ARMA raw output to control the amplitude of this random term.

Thus, in such embodiments, controllably modifying the original unmodified value of the at least one PHY-layer signal parameter according to the autoregressive moving average process may include generating a sequence of random numbers based on a pseudorandom generator process, inputting the sequence of random numbers to a z-transform implementation of the autoregressive moving average process to generate a resultant sequence, and modifying the original unmodified value of the at least one PHY-layer signal parameter (e.g., amplitude, frequency, gain, phase, etc.) based on the resultant sequence.

It is to be noted that some WiFi measurements may have functional relation to others. For instance, RSSI and range (or delta (Δ) RSSI and delta (Δ) RTT) may be related. Thus, under some circumstances, a party may be able to deduce the dithering sequence of, for example, RSSI, if the RTT is left un-dithered (and vice versa). Also, it may be possible to deduce the dithering sequence if two measurable values (e.g., RSSI and RTT) are dithered with exactly the same varying signal modification process (e.g., with the same autoregressive sequence). Thus, it may be desirable to use different dithering functions/processes for different measurables. Accordingly, in some embodiments, controllably modifying the original unmodified value of the at least one PHY-layer signal parameter according to at least one pre-determined varying signal modification process may include controllably modifying each original unmodified value of two or more PHY-layer signal parameters according to respective different pre-determined varying signal modification processes.

With continued reference to FIG. 4, the signal with the controllably modified value of the at least one PHY-layer signal parameter is transmitted 420 (e.g., through one of various transceivers or transmitter devices) to a second wireless device (e.g., a receiving wireless device such as the device 108 of FIG. 1 or the device 200 of FIG. 2). The transmitted signal is configured to facilitate position determination at/for the second wireless device when the original unmodified value of the at least one PHY-layer signal parameter is determined at the second wireless device from the controllably modified value of the at least one PHY-layer signal parameter. To determine the original value of the controllably modified at least one signal parameter of the received signal, the receiving device would need to know the process/function that was used at the transmitting device to vary the signal (e.g., to dither it) and/or to know/determine an inverse process/function that needs to be applied to the received signal in order to recover the original value(s) (e.g., the original/initial values prior to modification by a varying process at the transmitting device/node) of the at least one signal parameter.

For example, in embodiments in which the varying signal modification process used at the transmitting device is a autoregressive moving average process, information such as the pseudorandom seed, scaling amplitude, starting time, etc., are provided to the authorized receiving device (e.g., in a secure manner at some earlier time preceding the dithered transmission). An un-dithering (i.e., inverting) process may thus include, in some embodiments, starting an equivalent pseudo-random process at the receiving device that will deliver the same digital sequence as the one used at the transmitting device (e.g., at the AP) as soon as the same seed and scaling factor are injected, and both sequences are synchronized in time. The receiving device can then subtract from the measurement the scaled output of the ARMA process. In this example, synchronization can be done in absolute mode (millisecond accuracy time of day can be easily obtained at the mobile over NTP or the cellular network), or by resynchronizing both processes. Absolute time synchronization accuracy may be loose (e.g., on the order of one second), as the synchronization needs to be done as a fraction of the sampling period (which is on the order of several seconds, with a periodicity of several minutes). This is because a dithering ARMA process is configured to have a slowly changing output, and therefore the absolute time clocks at the transmitting device and receiving device do not have to be very accurately synchronized for the un-dithering at the receiving device to work well. Incorrect synchronization may engender a graceful degradation, as the very slowly evaluating output provides a high correlation of the outputs, even for intervals several times longer than the sampling period. In this example, the net effect of dithering may be a slowly varying "natural-looking" physical phenomenon that will wander around the true value during a time substantially equal to the PRN sequence (this may be similar to the effect of ionosphere errors in GNSS). Because dithering functions generally are not synchronized across AP's, and because the estimated position depends on the measurement contributions of each AP, the effective repetition period of the 2D position error pattern will be the product of the dithering periods of all the AP's used for a position fix.

Recovered original value(s) of the at least one PHY-layer signal parameter at the receiving device can thus be used to determine position of the receiving device. For example, metrics such as RSSI and/or RTT can be derived from the recovered original values of the signal parameters of the signals received from one or more access points (each of which may be identified by an access point identifier, such as a unique MAC address associated with the access point), or from other types of transmitters, and those metrics may be used to determine an estimate of the second (receiving) wireless device's location. For example, a database (which may be stored locally or at a remote device/system), containing geographic locations, processing delays, power profiles, RTT profiles, and other such information for multiple transmitting device (e.g., access points) with known geographical positions, may be accessed and relevant data (e.g., for particular transmitters/access points from which signals at the receiving device were received) may be obtained. The database data so obtained may be used to facilitate location determination of the receiving device. For example, the relative distances of the receiving device from the transmitting devices (access points) transmitting the signals may be determined based, at least in part, on known locations for those transmitters/access points stored on the accessed database, and an estimation of the location of the device may be computed/derived (e.g., using multilateration procedures, such as a trilateration procedure). In some embodiments, the position of the mobile device may be also be determined, for example, by comparing the actual measured values of signal strength (or RSSI) and/or RTT obtained from one or more transmitting device (access points) to stored profiles to identify a profile matching (approximately or precisely) the set of metric values determined by the receiving device (this location determination procedure is also referred to as a "fingerprinting" procedure). It is to be noted that, in some embodiments, database(s) for RSSI and/or RTT fingerprints could be created using RF propagation models (e.g., that take into account wall geometry). In such embodiments it is usually necessary to get at least some real survey measurements in order to properly calibrate the parameters used by the RF propagation model. A location estimate associated with a matching stored profile may then be deemed to be an estimate of the current location of the receiving device that received the transmitting devices'/access points' signals. Thus, in some embodiments, the transmitted signal configured to facilitate position determination at the second wireless device is configured to facilitate position determination at the second wireless device based on one or more of, for example, a received signal strength indicator (RSSI)-based positioning determination process, a round trip time (RTT)-based position determination process, and/or a speed-based position determination process aided by an inertial navigation system. In some embodiments, the RSSI-based position determination process may include an RSSI-fingerprinting process. In some embodiments, the RTT-based position determination process may include an RTT-fingerprinting process.

In some embodiments, a transmitting device (such as an AP) may use a single dithering sequence for all its transmissions. However, this may not prevent/inhibit unauthorized parties from collecting un-dithered fingerprints. For example, a static reference STA may collect the same WiFi frames and measurements that are collected simultaneously by a rover STA. In a post-processing step, correction values for each time epoch can be determined by the static STA data collected. These correction values are then applied to the rover STA data set. This may enable determining (and thus removing) the dithering that is common to both data sets. A similar approach could be used for real-time positioning that is analogous to the RTCM (Real-Time Correction Message) used in D-GPS and RTK positioning. Real-time WiFi measurements correction information could be transmitted to clients using something similar to the NTRIP HTTP-based protocol for GNSS. However, if a transmitting device applies a unique varying signal modification process to unicast frames directed to a specific receiving STA (regardless of whether different dithering or other varying signal modification processes are applied to different parameters of the transmitted signals), and a different dithering process to another receiving station, the reference station would have to transmit dither correction values for every signal to the receiving STA. This may present a challenge when performed at a large scale.

In private/stand-alone APs, management of signal modification processes to modify PHY-layer parameters may be such that signal parameters are generated using some hash function based on a security password that needs to be established during setup of the AP. If the AP is to be usable for location determination functionality, but for authorized users only, the AP may broadcast these parameters (including broadcasting, for example, actual dithering/varying signal modification functions) in its WiFi beacons in an encrypted form, or a central server may collect this information from the AP during setup, and only authorized users may then access this information.

Figure 5:
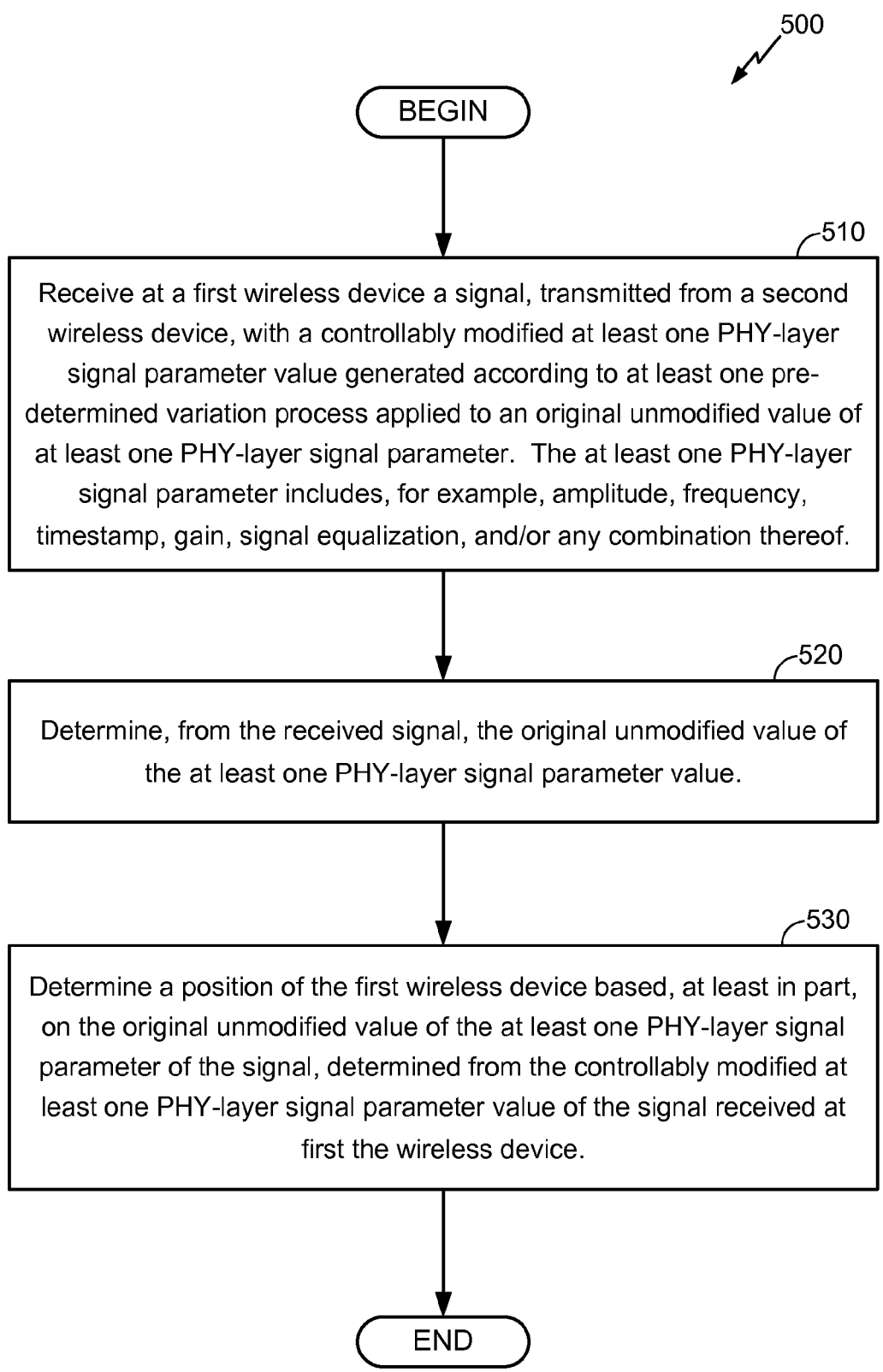
FIG. 5 is a flowchart of an example procedure to perform location determination using dithered signals.

With reference now to FIG. 5, a flowchart of an example procedure 500 used for location determination using dithered signals is shown. The operations depicted in FIG. 5 are generally performed at a device receiving signals that are used to perform position determination. The procedure 500 includes receiving 510 (e.g., using one of various transceivers or receivers) at a first wireless device (which may be similar to the device 108 or the device 200 depicted in FIGS. 1 and 2, respectively) a signal, transmitted from a second wireless device (such as an AP), with a controllably modified at least one PHY-layer signal parameter value that was generated according to at least one pre-determined varying signal modification process applied to an original unmodified value of the at least one PHY-layer signal parameter. The at least one PHY-layer signal parameter includes, for example, amplitude, frequency, timestamp, gain, signal equalization, and/or any combination thereof. In some embodiments, the receiving device may be an AP, such as any of the AP's 104a-c, or 106a-e of FIG. 1 (implementing undithering processes in AP's may thus enable realization of, for example, bi-directional dithering implementations, or realization of device tracking functionality implemented through AP's).

An original unmodified value of the at least one PHY-layer signal parameter value is determined 520 from the received signal (e.g., by applying to the received signal, or its decoded value, an inverse process/function which was provided to the receiving device at an earlier time). Having determined the original value(s) of the at least one PRY-layer signal parameter, a position of the first wireless device is determined 530 based, at least in part, on the original unmodified value of the at least one PHY-layer signal parameter of the signal, determined from the controllably modified at least one PHY-layer signal parameter value of the signal received at the first wireless device. For example, various location determination procedures (e.g., fingerprinting, multilateration, etc.) may be performed on the undithered PHY-layer values determined by the receiving device.

As noted, in some embodiments, further dithering operations to inhibit location determination functionality by unauthorized users/applications/devices may be performed through application of pre-determined varying process(es) to determine signal transmission characteristics (such as antenna-based transmission characteristics) that are used to transmit signals from one wireless device to another. In some embodiments, the signal transmitted may not include information about the transmission characteristics that were controlled according to the pre-determined varying process (for example, the signal itself may not include information about which antenna was selected, what relative phases and amplitudes were directed to the transmitter's multiple antennas that resulted in particular beam features, etc.), and thus the receiving device would need to have knowledge about the particular varying process(es) used in order to compensate for the transmission characteristics used at the transmitting device. In some embodiments, information about the values of the transmission characteristics and/or the varying processes used may be includes in the signal (e.g., as encrypted information).

Figure 6:
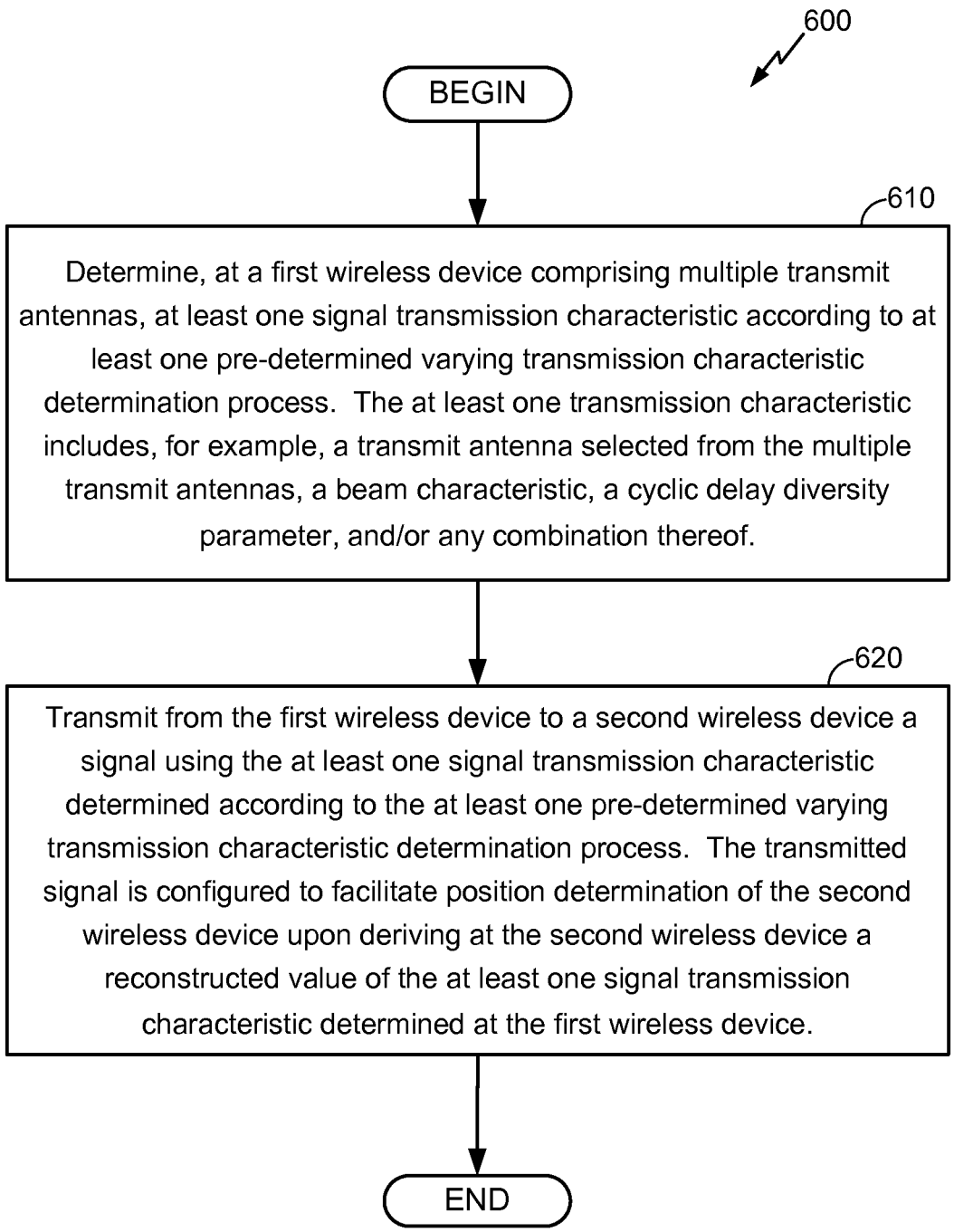
FIG. 6 is a flowchart of an example procedure to control/determine transmission characteristics.

Accordingly, with reference to FIG. 6, a flowchart of an example procedure 600 to control/determine transmission characteristics is shown. The procedure 600 includes determining 610, at a first wireless device (e.g., an AP such as a WiFi AP) comprising multiple transmit antennas, at least one signal transmission characteristic according to at least one pre-determined varying transmission characteristic determination process, with the at least one transmission characteristic including, for example, a transmit antenna selected from the multiple transmit antennas, a beam characteristic, a cyclic delay diversity parameter, or any combination thereof. As noted, determining the at least one signal transmission characteristic according to the at least one pre-determined varying transmission characteristic determination process may include determining the at least one signal transmission characteristic according to at least one autoregressive moving average process. In such embodiments, implementing an autoregressive moving average process may include generating a sequence of random numbers based on a pseudorandom generator process, inputting the sequence of random numbers to a z-transform implementation of the at least one autoregressive moving average process to generate a resultant sequence, and determining the at least one signal transmission characteristic based on the resultant sequence. Additionally, clocks at the first wireless device and the second wireless device may be synchronized relative to a reference time, and a second pseudorandom number sequence at the second wireless device may be generated such that the second pseudorandom number sequence is synchronized with the sequence of random numbers generated at the first wireless device.

In some embodiments, determining the at least one signal transmission characteristic may include determining the at least one signal transmission characteristic according to at least one pseudorandom-time-variation-based process. For example, the transmit antenna(s) to be used at particular time instances may be determined according to a pseudorandom-time-variation-based antenna selection process. In some embodiments, the varying pseudorandom-time-variation-based antenna selection may be such that more than one antenna is selected to simultaneously transmit signals through the selected antennas. In another example, the at least one varying pseudorandom-time-variation-based process may include multiple varying processes applied to determine/adjust the relative phases and amplitudes for each of multiple signals respectively directed to each of the multiple transmit antennas of the transmitting device (e.g., control the vector of phases and vector of amplitudes). By controlling the phases and amplitudes of the signals directed to the multiple antennas, beam steering attributes for the radiation pattern resulting from transmission of signals via the multiple antennas (e.g., control the direction and/or shape of the main lobe of the radiation pattern resulting from the transmission through the multiple antennas) can thus be controlled. Controlling the direction and/or shape of the main lobe of the radiation pattern through varying processes (e.g., pseudorandom processes) that is not known to unauthorized users/applications/devices provides another way to dither signals in such a way that accurately determining the location of a wireless device is inhibited. In yet a further example, the at least one varying pseudorandom-time-variation-based process may be used to implement a cyclic delay diversity functionality. Thus, in such implementations, cyclic delay durations for different signals (e.g., for different OFDM symbols) may be selected according to, for example, a pseudorandom-time-variation-based process that is known at the receiving wireless device, but not known to unauthorized users/applications/devices.

With continued reference to FIG. 6, the at least one transmission characteristic determined according to the at least one pre-determined varying transmission characteristic is used to transmit 620 a signal from the first wireless device to a second wireless device (e.g., a mobile device). The transmitted signal is configured to facilitate position determination of the second wireless device (or some other wireless device) upon deriving reconstructed value of the at least one signal transmission characteristic determined at the first wireless device (i.e., upon deriving at the second wireless device a reconstructed value of the at least one signal transmission characteristic that was initially determined at the first wireless device). Generally, without knowing what varying process was used at the first (transmitting) device to determine the transmission characteristic used at the first wireless device when the signal was transmitted, the receiving device does not have complete or accurate information that would be required to accurately perform location determination functionality. For example, without knowing what antenna(s) was selected from a transmitting device's multiple antennas, the receiving device would have difficulty compensating for the variations in the path traversed by the transmitted signal (i.e., the channel). In some embodiments, the transmitted signal configured to facilitate position determination of the second wireless device (or some other device) may be configured to facilitate position determination of the second wireless device based on one or more of, for example, a received signal strength indicator (RSSI)-based positioning determination process, a round trip time (RTT)-based position determination process, and/or a speed-based position determination process aided by an inertial navigation system.

In some embodiments, in addition to controlling at least one antenna-based transmission characteristics according to at least one varying transmission characteristic determination process (e.g., a pseudorandom process), a transmitting device may also be configured to controllably modify an original unmodified value of at least one PHY-layer parameter of the signal to be transmitted, such as the signal's amplitude, frequency, timestamp, gain, signal equalization, delay, signal phase, and/or any combination thereof.

As also noted, in some embodiments, the first (transmitting) device may include an access point, such as a WiFi access point, and the second (receiving) wireless device may include a preauthorized wireless device equipped with an undithering integrated circuit configured to enable undithering of the signal transmitted from the first wireless device using the at least one signal transmission characteristic determined according to the at least one pre-determined varying determination process.

Figure 7:
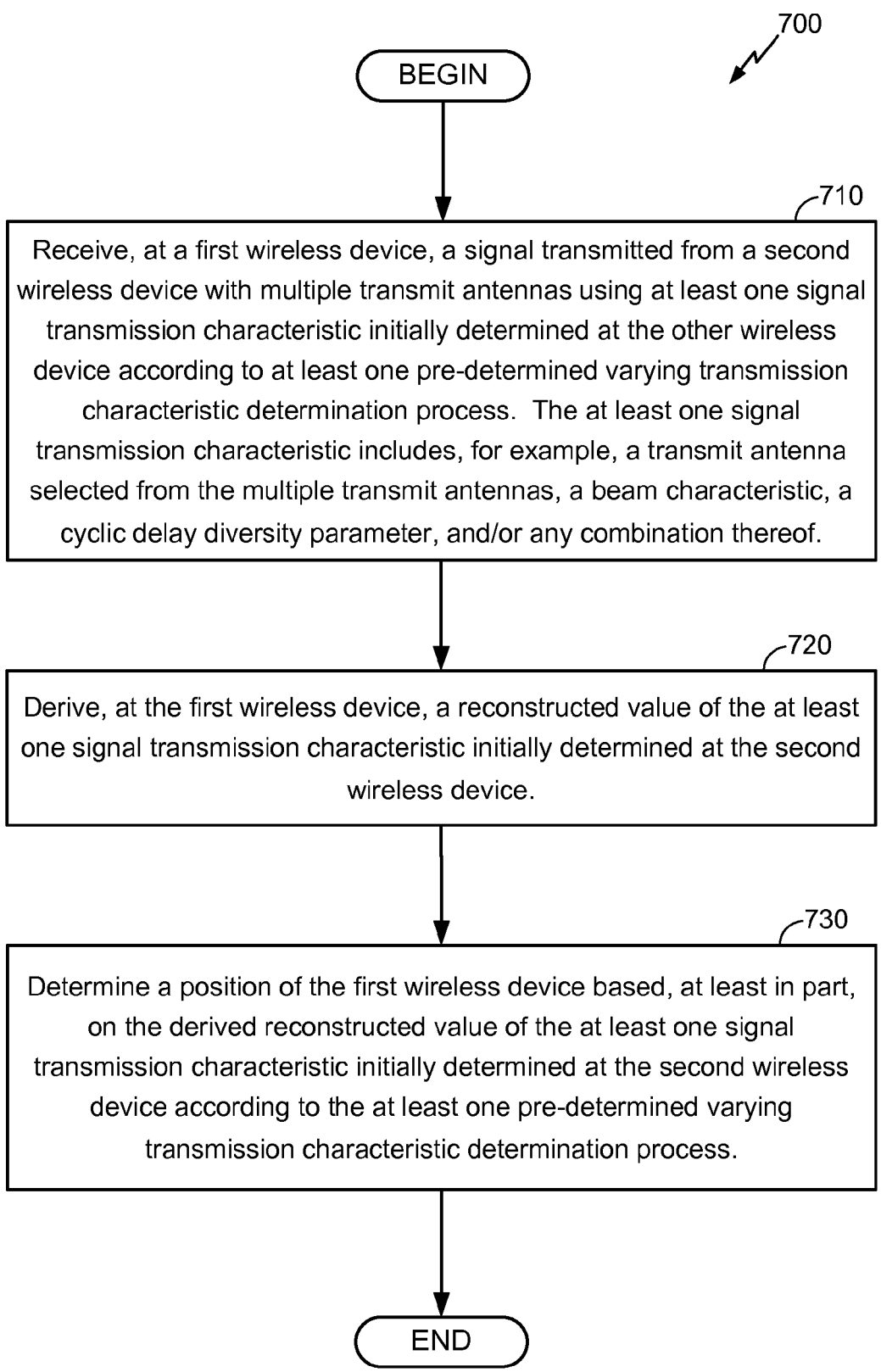
FIG. 7 is a flowchart of another example procedure to perform location determination using dithered signals

With reference now to FIG. 7, a flowchart of an example procedure 700 to perform location determination using dithered signals is shown. The procedure 700 includes receiving 710 at a first wireless device (e.g., a personal mobile device, such a cell phone) a signal transmitted from a second wireless device (e.g., an AP) that includes multiple transmit antennas using at least one signal transmission characteristic initially determined at that other wireless device according to at least one pre-determined varying transmission characteristic determination process. The at least one signal transmission characteristic includes, for example, a transmit antenna selected from the multiple transmit antennas, a beam characteristic, a cyclic delay diversity parameter, and/or any combination thereof. As noted, in some embodiments, the at least one signal transmission characteristic, initially determined according to the at least one pre-determined varying transmission characteristic determination process, may include the transmit antenna selected at the second wireless device from the multiple transmit antennas according to a pseudorandom-time-variation-based antenna selection process, a corresponding relative phase and a corresponding amplitude for each of multiple signals, respectively directed to each of the multiple transmit antennas to control a varying beam, that are controllably adjusted at the second wireless device according to one or more pseudorandom-time-variation-based beam forming processes, and/or a corresponding delay added to at least one of multiple signals, respectively directed to at least one of the multiple transmit antennas, controllably adjusted at the second wireless device according to a respective at least one pseudorandom-time-variation-based cyclic delay process.

The procedure 700 further includes deriving 720 at the first wireless device a reconstructed value of the at least one signal transmission characteristic initially determined at the second wireless device, and determining 730 a position of the first wireless device based, at least in part, on the derived reconstructed value of the at least one signal transmission characteristic initially determined at the second wireless device according to the at least one pre-determined varying transmission characteristic determination process.

In some embodiments, the procedure 700 may further include determining from the received signal an original value (i.e., prior to being modified by a pre-determined varying modification process) of at least second signal transmission characteristics, e.g., a PHY-layer signal parameter that is controllably modified at the second wireless device according to at least one pre-determined varying transmission characteristic modification process. The at least second signal transmission characteristic may include, for example, signal amplitude, signal frequency, signal timestamp, signal gain, signal equalization, signal delay, signal phase, and/or any combination thereof.

Figure 8:
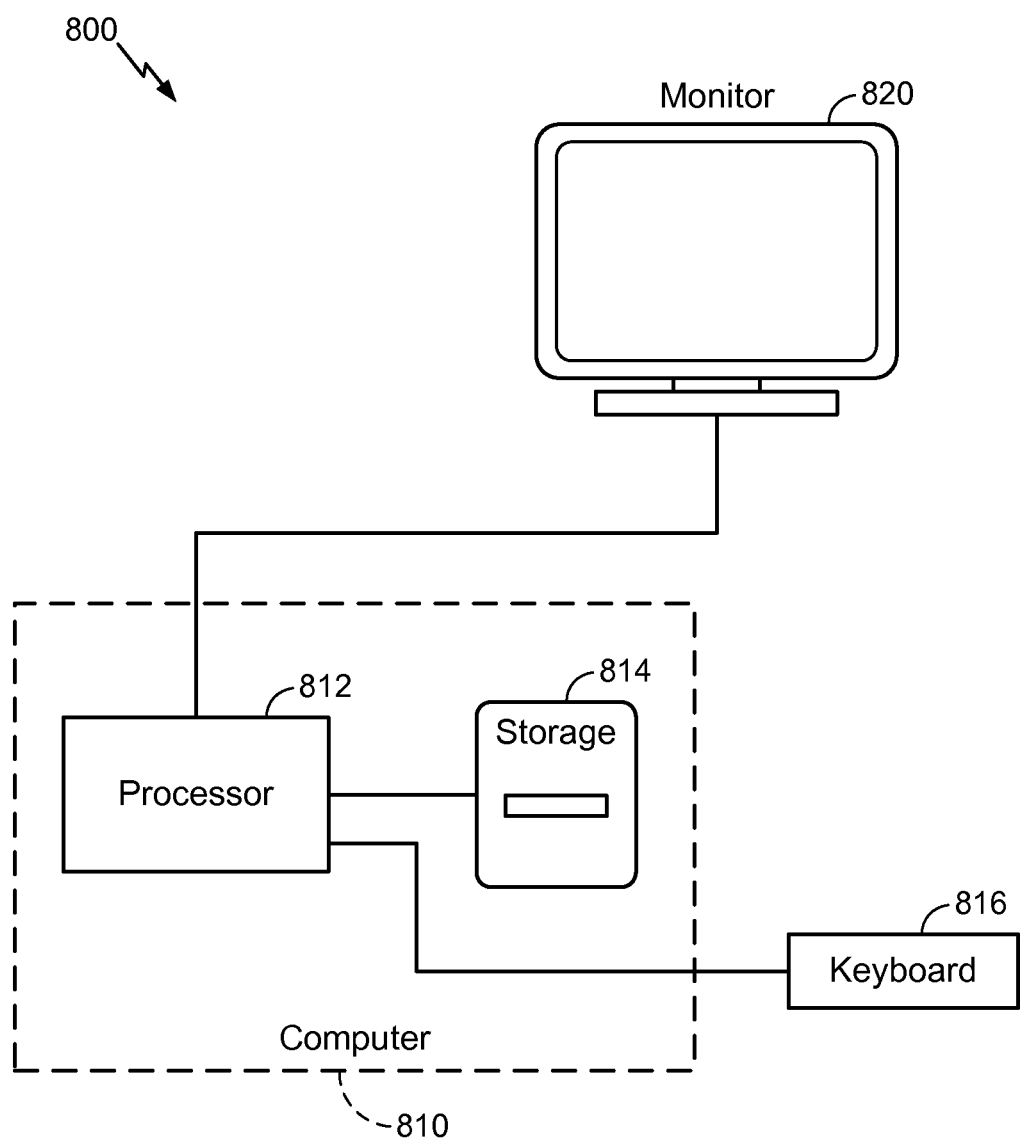
FIG. 8 is a schematic diagram of an example computing system.

Performing the procedures to determine transmission characteristics (e.g., modify/dither signal parameters of a signal) to recover original values of such transmission characteristics (e.g., at a receiving device), and/or to determine position of a wireless device receiving such dithered signals, may be facilitated by a processor-based computing system. With reference to FIG. 8, a schematic diagram of an example computing system 800 is shown. The computing system 800 may be housed in, for example, a handheld mobile device such as the devices 108 and 200 of FIGS. 1 and 2, respectively, a transmitting device, such as the access points 104*a-c* and 106*a-e* depicted in FIG. 1 or the access point 300 depicted in FIG. 3, etc. The computing system 800 includes a processor-based device 810 such as a personal computer, a specialized computing device, and so forth, that typically includes a central processor unit 812. In addition to the CPU 812, the system includes main memory, cache memory and bus interface circuits (not shown). The processor-based device 810 may include a mass storage device 814, such as a hard drive and/or a flash drive associated with the computer system. The computing system 800 may further include a keyboard, or keypad, 816, and a monitor 620, e.g., a CRT (cathode ray tube) or LCD (liquid crystal display) monitor, that may be placed where a user can access them (e.g., a mobile device's screen).

The processor-based device 810 is configured to, for example, implement the procedures and methods described herein, including procedures to controllably modify at least one PHY-layer signal parameter according to at least one pre-determined varying signal modification process, determine at least one transmission characteristic (e.g., antenna-based transmission characteristic) according to a pre-determined varying process, recover original values of signal parameters/transmission characteristics controlled according to varying processes/functions, and/or perform position determination operations. The mass storage device 814 may thus include a computer program product that when executed on the processor-based device 810 causes the processor-based device to perform operations to facilitate the implementation of the above-described procedures.

The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 800. Other modules that may be included with the processor-based device 810 are speakers, a sound card, a pointing device, e.g., a mouse or a trackball, by which the user can provide input to the computing system 800. The processor-based device 810 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" may refer to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of storage media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication.

The computing system may include clients and servers. A client and server are generally remote from each other and typically interact through a communication network. The relationship of client and server generally arises by virtue of computer programs running on the respective computers and having a client-server relationship to each other.

Further Applications and Uses

In some jurisdictions, it may be illegal to collect MACIDs and associate these with a geographical location. Typically, nearby GPS fixes are associated with the MACID (obtained for example via crowdsourcing from vehicles and/or pedestrians passing by). By using the methods and procedures described herein, it may become more difficult to obtain AP position estimates that are more accurate than the nearby GPS fixes. Thus, the procedures/methods/techniques described herein may be configured to be turned on by default in stand-alone personal and commercial APs in some jurisdictions. A private AP owner may want to deny the usage of his/her AP for location determination purposes. In addition to the "hidden BSSID" check mark (or coupled with it), there may be a check mark to deny or allow the usage of this AP for location determination (e.g., an end-user configurable AP option that may be activated or deactivated by, for example, setting/unsetting a checkbox next to the description of the option on a configuration web page for the particular AP). The checkmark could automatically trigger the setup of default dithering parameters. For instance, the dithering process seed and other parameters could be calculated automatically from the network SSID and passphrase (the user might also have the option of setting these parameters manually).

In some embodiments, users of WiFi-equipped devices such as smartphones may wish to make it more difficult for network-based positioning system to track them. Probes originating from the infrastructure APs could be responded to using the dithering varying-signal-modification processes described herein. Thus, in some embodiments, a person's handheld device (such as a mobile device) may be configured to apply a varying signal modification process to controllably modify an original unmodified value of at least one PHY-layer parameter of a signal transmitted by the device. For example, transmission power of a signal to be transmitted by such a handheld device may be controlled according to a varying modification process (e.g., a position or time dependent process, such as a pseudorandom-time-variation-based process), a delay with a length determined according to a varying process may be added to the signal, etc. The signal whose PHY-layer parameters(s) have been modified in such a manner will thus inhibit or interfere with position tracking processes to track its position by unauthorized access points that do not have information about the varying process(es) that would be required to recover the original unmodified value of the signals they receive from the mobile device. While the controllable modification of PHY-layer parameters of signals transmitted by the mobile device is used to interfere with or inhibit the ability of access points receiving the signals to track the position of a transmitting mobile device, content data included or represented by those signals may remain unmodified.

In some embodiments, personal devices such as mobile phones or tablets may implement peer-to-peer positioning estimation and reporting features. These could be based, at least in part, on peer-to-peer range estimation (e.g., using RSSI or RTT). Certain users may want to deny peers access to accurate range information and allow only coarse proximity information. Some users may thus elect to prevent accurate range estimation by peers by implementing/activating controllable signal modification features similar to those described herein.

In some embodiments, a venue owner may want to block any and all persons from getting any useful measurements from the venue AP's for positioning purposes (e.g., populating a WiFi fingerprint DB), or for any other purpose. This might be done for local privacy policy or governmental regulatory reasons. The venue owner's managed network may thus deploy AP's configured to perform controllable modification of signals' PHY-layer parameters in the manner described herein. For example, in circumstances where the access points deployed include WiFi access points, those access points may be configured to perform WiFi dithering. The feature could then be activated in each AP from a centralized network controller (such a controller may be implemented on a server such as the server 110 depicted in FIG. 1). The control of the dithering process(es) (e.g., some predetermined autoregressive moving average (ARMA) process/function) and their parameters (amplitude, frequency, and so forth) may be performed from the controller. The parameterization could be changed at will and as often as desired from the controller.

In some embodiments, a venue owner may want to limit the access to indoor location to his authorized customers/clients applications and to limit analytics to its own internal use. A predetermined varying signal modification process/function (e.g., a compact representation of a dithering function for each AP, represented, for example, as a state-space model, and associated parameters for each such function) could be communicated in a secure way to authorized clients/customers. This information could be bundled with other assistance data (AD), such as floor maps or RSSI/RTT heat maps, etc. Alternatively and/or additionally, the dithering function(s) and parameters might be embedded in a secure way in proprietary and encrypted AP beacon data elements. The client device will then be able to apply inverse functions/processes on the controllably modified (dithered) signals it receives in order to remove the effect of the dithering from the measurements of interest.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
   determining, at a first wireless device comprising multiple transmit antennas, at least one signal transmission characteristic according to at least one pre-determined process to controllably vary the at least one signal transmission characteristic, the at least one signal transmission characteristic including: a transmit antenna selected from the multiple transmit antennas, a beam characteristic, a cyclic delay diversity parameter, or any combination thereof; and
   transmitting, from the first wireless device to a second wireless device, a signal using the at least one signal transmission characteristic determined according to the at least one pre-determined process, wherein the transmitted signal is configured to facilitate position determination of the second wireless device, at the second wireless device, based at least in part on a reconstructed value of the at least one signal transmission characteristic;
   wherein the reconstructed value of the at least one signal transmission characteristic is derived, at the second wireless device, according to the at least one pre-determined process initially used at the first wireless device to determine the at least one signal transmission characteristic.

2. The method of claim 1, further comprising:
   controllably modifying an original value of at least one second signal transmission characteristic according to at least one pre-determined modification process, the at least one second signal transmission characteristic including: signal amplitude, signal frequency, signal timestamp, signal gain, signal equalization, signal delay, signal phase, or any combination thereof.

3. The method of claim 1, wherein determining the at least one signal transmission characteristic according to the at least one pre-determined process comprises:
   determining the at least one signal transmission characteristic according to at least one time dependent pseudorandom process.

4. The method of claim 1, wherein determining the at least one signal transmission characteristic according to the at least one pre-determined process comprises:
   selecting the transmit antenna from the multiple transmit antennas according to a time dependent pseudorandom antenna selection process.

5. The method of claim 1, wherein determining the at least one signal transmission characteristic according to the at least one pre-determined process comprises:
   controllably adjusting, according to one or more time dependent pseudorandom beam control processes, a corresponding relative phase and a corresponding amplitude for each of multiple signals respectively directed to each of the multiple transmit antennas to control a varying beam.

6. The method of claim 1, wherein determining the at least one signal transmission characteristic according to the at least one pre-determined process comprises:
   controllably adjusting, according to at least one time dependent pseudorandom cyclic delay process, a corresponding delay added to at least one of multiple signals respectively directed to at least one of the multiple transmit antennas.

7. The method of claim 1, wherein determining the at least one signal transmission characteristic according to the at least one pre-determined process comprises:
   determining the at least one signal transmission characteristic according to at least one autoregressive moving average process.

8. The method of claim 7, wherein determining the at least one signal transmission characteristic according to the at least one autoregressive moving average process comprises:
   generating a sequence of random numbers based on a pseudorandom generator process;
   inputting the sequence of random numbers to a z-transform implementation of the at least one autoregressive moving average process to generate a resultant sequence; and
   determining the at least one signal transmission characteristic based on the resultant sequence.

9. The method of claim 8, wherein respective clocks at the first wireless device and the second wireless device are synchronized relative to a reference time, and wherein a second pseudorandom number sequence at the second wireless device is generated such that the second pseudorandom number sequence is synchronized with the sequence of random numbers generated at the first wireless device.

10. The method of claim 1, wherein the transmitted signal configured to facilitate position determination of the second wireless device is configured to facilitate position determination of the second wireless device based on one or more of: a received signal strength indicator (RSSI)-based positioning determination process, a round trip time (RTT)-based position determination process, a speed-based position determination process aided by an inertial navigation system, or any combination thereof.

11. The method of claim 1, wherein the first wireless device comprises an access point.

12. The method of claim 1, wherein the second wireless device comprises a preauthorized wireless device equipped with an undithering unit configured to enable undithering of the signal transmitted from the first wireless device using the at least one signal transmission characteristic determined according to the at least one pre-determined process.

13. A wireless device comprising:
   multiple transmit antennas;
   one or more processors; and
   storage media comprising computer instructions that, when executed on the one or more processors, cause operations comprising:
     determining, at the wireless device, at least one signal transmission characteristic according to at least one pre-determined process to controllably vary the at least one signal transmission characteristic, the at least one signal transmission characteristic including: a transmit antenna selected from the multiple transmit antennas, a beam characteristic, a cyclic delay diversity parameter, or any combination thereof; and
     transmitting, from the wireless device to an other wireless device, a signal using the at least one signal transmission characteristic determined according to the at least one pre-determined process, wherein the transmitted signal is configured to facilitate position determination of the other wireless device, at the other wireless device, based at least in part on a reconstructed value of the at least one signal transmission characteristic;
   wherein the reconstructed value of the at least one signal transmission characteristic is derived, at the other wireless device, according to the at least one pre-determined process initially used at the wireless device to determine the at least one signal transmission characteristic.

14. The wireless device of claim 13, wherein the storage media comprise further instructions to cause further operations comprising:
   controllably modifying an original value of at least one second signal transmission characteristic according to at least one pre-determined modification process, the at least one second signal transmission characteristic including: signal amplitude, signal frequency, signal timestamp, signal gain, signal equalization, signal delay, signal phase, or any combination thereof.

15. The wireless device of claim 13, wherein determining the at least one signal transmission characteristic according to the at least one pre-determined process comprises:
   selecting the transmit antenna from the multiple transmit antennas according to a time dependent pseudorandom antenna selection process.

16. The wireless device of claim 13, wherein determining the at least one signal transmission characteristic according to the at least one pre-determined process comprises:
   controllably adjusting, according to one or more time dependent pseudorandom beam control processes, a corresponding relative phase and a corresponding amplitude for each of multiple signals respectively directed to each of the multiple transmit antennas to control a varying beam.

17. The wireless device of claim 13, wherein determining the at least one signal transmission characteristic according to the at least one pre-determined process comprises:
   controllably adjusting, according to at least one time dependent pseudorandom cyclic delay process, a corresponding delay added to at least one of multiple signals respectively directed to at least one of the multiple transmit antennas.

18. The wireless device of claim 13, wherein determining the at least one signal transmission characteristic according to the at least one pre-determined process comprises:
   determining the at least one signal transmission characteristic according to at least one autoregressive moving average process.

19. The wireless device of claim 18, wherein determining the at least one signal transmission characteristic according to the at least one autoregressive moving average process comprises:
   generating a sequence of random numbers based on a pseudorandom generator process;
   inputting the sequence of random numbers to a z-transform implementation of the at least one autoregressive moving average process to generate a resultant sequence; and
   determining the at least one signal transmission characteristic based on the resultant sequence.

20. The wireless device of claim 13, wherein the other wireless device comprises a preauthorized wireless device equipped with an undithering unit configured to enable undithering of the signal transmitted from the wireless device using the at least one signal transmission characteristic determined according to the at least one pre-determined process.

21. An apparatus comprising:
   means for determining at least one signal transmission characteristic according to at least one pre-determined process to controllably vary the at least one signal transmission characteristic, the at least one signal transmission characteristic including: a transmit antenna selected from multiple transmit antennas, a beam characteristic, a cyclic delay diversity parameter, or any combination thereof; and means for transmitting, to a receiving wireless device, a signal using the at least one signal transmission characteristic determined according to the at least one pre-determined process, wherein the transmitted signal is configured to facilitate position determination of the receiving wireless device, at the receiving wireless device, based at least in part on a reconstructed value of the at least one signal transmission characteristic;

wherein the reconstructed value of the at least one signal transmission characteristic is derived, at the receiving wireless device, according to the at least one pre-determined process initially used at the apparatus to determine the at least one signal transmission characteristic.

22. The apparatus claim 21, further comprising:
means for controllably modifying an original value of at least one second signal transmission characteristic according to at least one pre-determined modification process, the at least one second signal transmission characteristic including: signal amplitude, signal frequency, signal timestamp, signal gain, signal equalization, signal delay, signal phase, or any combination thereof.

23. The apparatus claim 21, wherein the means for determining the at least one signal transmission characteristic according to the at least one pre-determined process comprises:
means for selecting the transmit antenna from the multiple transmit antennas according to a time dependent pseudorandom antenna selection process.

24. The apparatus claim 21, wherein the means for determining the at least one signal transmission characteristic according to the at least one pre-determined process comprises:
means for controllably adjusting, according to one or more time dependent pseudorandom beam control processes, a corresponding relative phase and a corresponding amplitude for each of multiple signals respectively directed to each of the multiple transmit antennas to control a varying beam.

25. The apparatus claim 21, wherein the means for determining the at least one signal transmission characteristic according to the at least one pre-determined process comprises:
means for controllably adjusting, according to at least one time dependent pseudorandom cyclic delay process, a corresponding delay added to at least one of multiple signals respectively directed to at least one of the multiple transmit antennas.

26. The apparatus claim 21, wherein the means for determining the at least one signal transmission characteristic according to the at least one pre-determined process comprises:
means for determining the at least one signal transmission characteristic according to at least one autoregressive moving average process.

27. The apparatus claim 26, wherein the means for determining the at least one signal transmission characteristic according to the at least one autoregressive moving average process comprises:
means for generating a sequence of random numbers based on a pseudorandom generator process;
means for inputting the sequence of random numbers to a z-transform implementation of the at least one autoregressive moving average process to generate a resultant sequence; and
means for determining the at least one signal transmission characteristic based on the resultant sequence.

28. The apparatus claim 21, wherein the receiving wireless device comprises a preauthorized wireless device equipped with an undithering unit configured to enable undithering of the signal transmitted from the apparatus using the at least one signal transmission characteristic determined according to the at least one pre-determined process.

29. A non-transitory processor readable media programmed with an instruction set executable on a processor that, when executed, causes operations comprising:
determining, at a first wireless device comprising multiple antennas, at least one signal transmission characteristic according to at least one pre-determined process to controllably vary the at least one signal transmission characteristic, the at least one signal transmission characteristic including: a transmit antenna selected from multiple transmit antennas, a beam characteristic, a cyclic delay diversity parameter, or any combination thereof; and
transmitting, from the first wireless device to a second wireless device, a signal using the at least one signal transmission characteristic determined according to the at least one pre-determined process, wherein the transmitted signal is configured to facilitate position determination of the second wireless device, at the second wireless device, based at least in part on a reconstructed value of the at least one signal transmission characteristic;
wherein the reconstructed value of the at least one signal transmission characteristic is derived, at the second wireless device, according to the at least one pre-determined process initially used at the first wireless device to determine the at least one signal transmission characteristic.

30. The processor readable media of claim 29, wherein the instruction set includes further instructions to cause further operations comprising:
controllably modifying an original value of at least one second signal transmission characteristic according to at least one pre-determined modification process, the at least one second signal transmission characteristic including: signal amplitude, signal frequency, signal timestamp, signal gain, signal equalization, signal delay, signal phase, or any combination thereof.

31. The processor readable media of claim 29, wherein determining the at least one signal transmission characteristic according to the at least one pre-determined process comprises:
selecting the transmit antenna from the multiple transmit antennas according to a time dependent pseudorandom antenna selection process.

32. The processor readable media of claim 29, wherein determining the at least one signal transmission characteristic according to the at least one pre-determined process comprises:
controllably adjusting, according to one or more time dependent pseudorandom beam control processes, a corresponding relative phase and a corresponding amplitude for each of multiple signals respectively directed to each of the multiple transmit antennas to control a varying beam.

33. The processor readable media of claim 29, wherein determining the at least one signal transmission characteristic according to the at least one pre-determined process comprises:
controllably adjusting, according to at least one time dependent pseudorandom cyclic delay process, a corresponding delay added to at least one of multiple signals respectively directed to at least one of the multiple transmit antennas.

34. The processor readable media of claim 29, wherein determining the at least one signal transmission characteristic according to the at least one pre-determined process comprises:
   determining the at least one signal transmission characteristic according to at least one autoregressive moving average process.

35. The processor readable media of claim 34, wherein determining the at least one signal transmission characteristic according to the at least one autoregressive moving average process comprises:
   generating a sequence of random numbers based on a pseudorandom generator process;
   inputting the sequence of random numbers to a z-transform implementation of the at least one autoregressive moving average process to generate a resultant sequence; and
   determining the at least one signal transmission characteristic based on the resultant sequence.

36. The processor readable media of claim 29, wherein the second wireless device comprises a preauthorized wireless device equipped with an undithering unit configured to enable undithering of the signal transmitted from the first wireless device using the at least one signal transmission characteristic determined according to the at least one pre-determined process.

37. A method comprising:
   receiving, at a first wireless device, a signal transmitted from a second wireless device with multiple transmit antennas using at least one signal transmission characteristic initially determined at the second wireless device according to at least one pre-determined process to controllably vary the at least one signal transmission characteristic, the at least one signal transmission characteristic including: a transmit antenna selected from the multiple transmit antennas, a beam characteristic, a cyclic delay diversity parameter, or any combination thereof;
   deriving, at the first wireless device, according to the at least one pre-determined process initially used at the second wireless device to determine the at least one signal transmission characteristic, a reconstructed value of the at least one signal transmission characteristic initially determined at the second wireless device; and
   determining a position of the first wireless device based, at least in part, on the derived reconstructed value of the at least one signal transmission characteristic initially determined at the second wireless device according to the at least one pre-determined process.

38. The method of claim 37, further comprising:
   determining, from the received signal, an original value of at least one second signal transmission characteristic controllably modified at the second wireless device according to at least one pre-determined modification process, the at least one second signal transmission characteristic comprising: signal amplitude, signal frequency, signal timestamp, signal gain, signal equalization, signal delay, signal phase, or any combination thereof.

39. The method of claim 37, wherein the at least one signal transmission characteristic, initially determined according to the at least one pre-determined process, is initially determined at the second wireless device according to at least one time dependent pseudorandom process.

40. The method of claim 37, wherein the at least one signal transmission characteristic initially determined according to the at least one pre-determined process, is initially determined at the second wireless device according to at least one autoregressive moving average process.

41. The method of claim 37, wherein the at least one signal transmission characteristic initially determined according to the at least one pre-determined process comprises:
   the transmit antenna selected at the second wireless device from the multiple transmit antennas according to a time dependent pseudorandom antenna selection process.

42. The method of claim 37, wherein the at least one signal transmission characteristic determined according to the at least one pre-determined process comprises:
   a corresponding relative phase and a corresponding amplitude for each of multiple signals, respectively directed to each of the multiple transmit antennas to control a varying beam, the corresponding relative phase and the corresponding amplitude for the each of the multiple signals being controllably adjusted at the second wireless device according to one or more time dependent pseudorandom beam forming processes.

43. The method of claim 37, wherein the at least one signal transmission characteristic initially determined according to the at least one pre-determined process comprises:
   a corresponding delay added to at least one of multiple signals, respectively directed to at least one of the multiple transmit antennas, controllably adjusted at the second wireless device according to a respective at least one time dependent pseudorandom cyclic delay process.

44. The method of claim 37, wherein the first wireless device comprises a preauthorized wireless device equipped with an undithering unit configured to enable undithering of the signal transmitted from the second wireless device using the at least one signal transmission characteristic determined according to the at least one pre-determined process.

45. A wireless device comprising:
   one or more processors; and
   storage media comprising computer instructions that, when executed on the one or more processors, cause operations comprising:
      receiving, at the wireless device, a signal transmitted from an other wireless device with multiple transmit antennas using at least one signal transmission characteristic initially determined at the other wireless device according to at least one pre-determined process to controllably vary the at least one signal transmission characteristic, the at least one signal transmission characteristic including: a transmit antenna selected from the multiple transmit antennas, a beam characteristic, a cyclic delay diversity parameter, or any combination thereof;
      deriving, at the wireless device, according to the at least one pre-determined process initially used at the other wireless device to determine the at least one signal transmission characteristic, a reconstructed value of the at least one signal transmission characteristic initially determined at the other wireless device; and
      determining a position of the wireless device based, at least in part, on the derived reconstructed value of the at least one signal transmission characteristic initially determined at the other wireless device according to the at least one pre-determined process.

46. The wireless device of claim 45, wherein the storage media comprise further instructions to cause further operations comprising:

determining, from the received signal, an original value of at least one second signal transmission characteristic controllably modified at the other wireless device according to at least one pre-determined modification process, the at least one second signal transmission characteristic comprising: signal amplitude, signal frequency, signal timestamp, signal gain, signal equalization, signal delay, signal phase, or any combination thereof.

47. The wireless device of claim 45, wherein the at least one signal transmission characteristic initially determined according to the at least one pre-determined process is initially determined at the other wireless device according to at least one autoregressive moving average process.

48. The wireless device of claim 45, wherein the at least one signal transmission characteristic initially determined according to the at least one pre-determined process comprises:
the transmit antenna selected at the other wireless device from the multiple transmit antennas according to a time dependent pseudorandom antenna selection process.

49. The wireless device of claim 45, wherein the at least one signal transmission characteristic determined according to the at least one pre-determined process comprises:
a corresponding relative phase and a corresponding amplitude for each of multiple signals, respectively directed to each of the multiple transmit antennas to control a varying beam, the corresponding relative phase and the corresponding amplitude for the each of the multiple signals being controllably adjusted at the other wireless device according to one or more time dependent pseudorandom beam forming processes.

50. The wireless device of claim 45, wherein the at least one signal transmission characteristic initially determined according to the at least one pre-determined process comprises:
a corresponding delay added to at least one of multiple signals, respectively directed to at least one of the multiple transmit antennas, controllably adjusted at the other wireless device according to a respective at least one time dependent pseudorandom cyclic delay process.

51. The wireless device of claim 45, wherein the wireless device comprises a preauthorized wireless device equipped with an undithering unit configured to enable undithering of the signal transmitted from the other wireless device using the at least one signal transmission characteristic determined according to the at least one pre-determined process.

52. An apparatus comprising:
means for receiving a signal transmitted from a transmitting wireless device with multiple transmit antennas using at least one signal transmission characteristic initially determined at the transmitting wireless device according to at least one pre-determined process to controllably vary the at least one signal transmission characteristic, the at least one signal transmission characteristic including: a transmit antenna selected from the multiple transmit antennas, a beam characteristic, a cyclic delay diversity parameter, or any combination thereof;
means for deriving, according to the at least one pre-determined process initially used at the transmitting wireless device to determine the at least one signal transmission characteristic, a reconstructed value of the at least one signal transmission characteristic initially determined at the transmitting wireless device; and
means for determining a position of the apparatus based, at least in part, on the derived reconstructed value of the at least one signal transmission characteristic initially determined at the transmitting wireless device according to the at least one pre-determined process.

53. The apparatus of claim 52, further comprising:
means for determining, from the received signal, an original value of at least one second signal transmission characteristic controllably modified at the transmitting wireless device according to at least one pre-determined modification process, the at least second signal transmission characteristic comprising: signal amplitude, signal frequency, signal timestamp, signal gain, signal equalization, signal delay, signal phase, or any combination thereof.

54. The apparatus of claim 52, wherein the at least one signal transmission characteristic initially determined according to the at least one pre-determined process is initially determined at the transmitting wireless device according to at least one autoregressive moving average process.

55. The apparatus of claim 52, wherein the at least one signal transmission characteristic initially determined according to the at least one pre-determined process comprises:
the transmit antenna selected at the transmitting wireless device from the multiple transmit antennas according to a time dependent pseudorandom antenna selection process.

56. The apparatus of claim 52, wherein the at least one signal transmission characteristic determined according to the at least one pre-determined process comprises:
a corresponding relative phase and a corresponding amplitude for each of multiple signals, respectively directed to each of the multiple transmit antennas to control a varying beam, the corresponding relative phase and the corresponding amplitude for the each of the multiple signals being controllably adjusted at the transmitting wireless device according to one or more time dependent pseudorandom beam forming processes.

57. The apparatus of claim 52, wherein the at least one signal transmission characteristic initially determined according to the at least one pre-determined process comprises:
a corresponding delay added to at least one of multiple signals, respectively directed to at least one of the multiple transmit antennas, controllably adjusted at the transmitting wireless device according to a respective at least one time dependent pseudorandom cyclic delay process.

58. The apparatus of claim 52, wherein the apparatus comprises a preauthorized wireless device equipped with an undithering unit configured to enable undithering of the signal transmitted from the transmitting wireless device using the at least one signal transmission characteristic determined according to the at least one pre-determined process.

59. A non-transitory processor readable media programmed with an instruction set executable on a processor that, when executed, causes operations comprising:
receiving, at a first wireless device, a signal transmitted from a second wireless device with multiple transmit antennas using at least one signal transmission characteristic initially determined at the second wireless device according to at least one pre-determined process to controllably vary the at least one signal transmission characteristic, the at least one signal transmission characteristic including: a transmit antenna selected from the multiple transmit antennas, a beam characteristic, a cyclic delay diversity parameter, or any combination thereof;

deriving, at the first wireless device, according to the at least one pre-determined process initially used at the second wireless device to determine the at least one signal transmission characteristic, a reconstructed value of the at least one signal transmission characteristic initially determined at the second wireless device; and determining a position of the first wireless device based, at least in part, on the derived reconstructed value of the at least one signal transmission characteristic initially determined at the second wireless device according to the at least one pre-determined process.

60. The processor readable media of claim 59, wherein the instruction set comprises further instructions to cause further operations comprising:

determining, from the received signal, an original value of at least one second signal transmission characteristic controllably modified at the second wireless device according to at least one pre-determined modification process, the at least one second signal transmission characteristic comprising: signal amplitude, signal frequency, signal timestamp, signal gain, signal equalization, signal delay, signal phase, or any combination thereof.

61. The processor readable media of claim 59, wherein the at least one signal transmission characteristic initially determined according to the at least one pre-determined process is initially determined at the second wireless device according to at least one autoregressive moving average process.

62. The processor readable media of claim 59, wherein the at least one signal transmission characteristic initially determined according to the at least one pre-determined process comprises:

the transmit antenna selected at the second wireless device from the multiple transmit antennas according to a time dependent pseudorandom antenna selection process.

63. The processor readable media of claim 59, wherein the at least one signal transmission characteristic determined according to the at least one pre-determined process comprises:

a corresponding relative phase and a corresponding amplitude for each of multiple signals, respectively directed to each of the multiple transmit antennas to control a varying beam, the corresponding relative phase and the corresponding amplitude for the each of the multiple signals being controllably adjusted at the second wireless device according to one or more time dependent pseudorandom beam forming processes.

64. The processor readable media of claim 59, wherein the at least one signal transmission characteristic initially determined according to the at least one pre-determined process comprises:

a corresponding delay added to at least one of multiple signals, respectively directed to at least one of the multiple transmit antennas, controllably adjusted at the second wireless device according to a respective at least one time dependent pseudorandom cyclic delay process.

65. The processor readable media of claim 59, wherein the first wireless device comprises a preauthorized wireless device equipped with an undithering unit configured to enable undithering of the signal transmitted from the second wireless device using the at least one signal transmission characteristic determined according to the at least one pre-determined process.

* * * * *